(12) United States Patent
Mochizuki

(10) Patent No.: US 8,277,093 B2
(45) Date of Patent: Oct. 2, 2012

(54) CONNECTOR, LED UNIT, AND METHOD FOR PRODUCING CONNECTOR

(75) Inventor: Shinji Mochizuki, Makinohara (JP)

(73) Assignee: Yazaki Corporation, Tokyo (JP)

( * ) Notice: Subject to any disclaimer, the term of this patent is extended or adjusted under 35 U.S.C. 154(b) by 406 days.

(21) Appl. No.: 12/659,290

(22) Filed: Mar. 3, 2010

(65) Prior Publication Data

US 2010/0226140 A1 Sep. 9, 2010

(30) Foreign Application Priority Data

| Mar. 9, 2009 | (JP) | 2009-054393 |
| Mar. 25, 2009 | (JP) | 2009-073128 |
| Dec. 16, 2009 | (JP) | 2009-285277 |

(51) Int. Cl.
*F21V 29/00* (2006.01)

(52) U.S. Cl. ........ 362/373; 362/218; 362/294; 362/547; 362/658; 362/659

(58) Field of Classification Search .................. 362/218, 362/294, 373, 547, 658, 659

See application file for complete search history.

(56) References Cited

U.S. PATENT DOCUMENTS

| 5,519,596 A | * | 5/1996 | Woolverton | ............. 362/249.01 |
| 7,137,852 B2 | * | 11/2006 | Tsukamoto | ................... 439/698 |
| 7,658,653 B2 | * | 2/2010 | Diekmann et al. | ............. 439/715 |
| 2001/0007526 A1 | * | 7/2001 | Ohkohdo et al. | ............. 362/249 |
| 2004/0252501 A1 | * | 12/2004 | Moriyama et al. | ............. 362/238 |
| 2005/0063181 A1 | | 3/2005 | Chiba et al. | |

* cited by examiner

*Primary Examiner* — Stephen F Husar
*Assistant Examiner* — James Cranson, Jr.
(74) *Attorney, Agent, or Firm* — Edwards Wildman Palmer LLP

(57) ABSTRACT

A connector includes: one terminal having a part-connecting portion to be connected to an anode of an LED; and the other terminal having the part-connecting portion to be connected to a cathode of the LED; and a housing in which the terminals are embedded. The connector is made by insert-molding. The terminals are arranged in a cavity formed between upper and lower dies so that the part-connecting portions are arranged in the same plane with a gap. An outer shape of the cavity corresponds to an outer shape of the connector. After a projection formed on the upper die is interposed between the part-connecting portions, the cavity is filled with melted synthetic resin to mold the housing.

5 Claims, 24 Drawing Sheets

CONNECTOR, LED UNIT, AND METHOD FOR PRODUCING CONNECTOR

CROSS REFERENCE TO RELATED APPLICATIONS

This application is on the basis of Japanese Patent Applications No. 2009-54393, No. 2009-073128, and No. 2009-285277, the contents of which are hereby incorporated by reference.

BACKGROUND OF THE INVENTION

1. Field of the Invention

The present invention relates to an LED unit having an LED chip, a bus bar, and a housing, disposed in a vehicle cabin, to a connector to which the LED unit is connected, and to a method for producing a connector.

2. Description of the Related Art

A room illumination device is for illuminating a vehicle cabin is mounted on a vehicle cabin. For example, an LED lamp module (also referred to as LED unit) of which light source is an LED (Light Emitting Diode) is used as the room illumination device (See Patent Document 1).

The LED lamp module described in Patent Document 1 integrally includes: an LED; and a holder for holding the LED. The LED integrally includes an LED chip; a pair of lead terminals of which one end is connected to the LED chip, and the other end is connected to an electric wire; and a resin lens for molding the LED chip.

When producing the LED lamp module, firstly, a chain body in which a plurality of lead terminals is connected with connecting parts is made by pressing a plate metal. Then, the LED chip is connected to one end of a pair of lead terminals among the lead terminals, and the one end of the lead terminals and the LED chip are disposed on one of cavities of a die, and then a resin lens in which the lead terminal and the LED chip are embedded is formed. Thus, a plurality of LEDs connected to each other is produced.

Then, the plurality of LEDs is respectively disposed on the cavities of a die to form a holder in which the LED is embedded. Thus, a plurality of LED lamp modules connected to each other is produced. Lastly, the connecting parts of the chain body are cut off to separate the LED lamp modules.

Thus, because the LED lamp module integrally includes: the LED chip; the lead terminals; the resin lens; and the holder, the number of assembling process is reduced. However, when a grade of a vehicle is changed and the LED (LED chip) is changed, a shape of the LED lamp module should be changed, and dies for forming the resin lens and the holder should be changed. Thus, production cost is increased.

Consequently, for example, a pair of terminals to be connected to the LED may be embedded in the holder, and the terminals may be connected to the LED at a post process. The one end of the terminal is connected to an anode of the LED, and the other end of the terminal is connected to a cathode of the LED.

[Patent Document 1] Japanese Published Patent Application No. 2005-93900

As described above, when the LED is connected to the pair of terminals embedded in the holder at the post process, for surely connecting the LED, the terminals should be embedded at positions where the terminals can be connected to the anode and the cathode of the LED. At this time, if a distance between the terminals is too small, the anode (or the cathode) of the LED may be connected to both of the terminals, and the terminals may be short-circuited. In particular, when the LED is a chip-type LED, because contact areas of the anode and the cathode are large, the terminals may be more easily short-circuited.

Incidentally, in a conventional LED unit (LED lamp module), when using a high-intensity LED, there is a problem that heat generated by the LED chip cannot be efficiently radiated.

Further, in the conventional LED unit, because an electric wire is in pressure-contact just next to an LED package, and a straight bus bar connects the LED chip with a pressure-contact part of the electric wire, there is a problem that an impact generated by the pressure-contact is easily transmitted to the LED package, and soldering performance of the LED chip is affected by the impact.

Accordingly, an object of the present invention is to provide a method for producing a connector, and to provide a connector and an LED unit to allow a gap between part-connecting portions of a pair of terminals embedded in a housing to be equal to or more than a specific distance.

Another object of the present invention is to provide the LED unit to allow heat of the LED chip to be radiated efficiently, and to allow an impact upon connecting an electric wire to be hardly transmitted to an LED package.

SUMMARY OF THE INVENTION

In order to attain the object, according to the present invention, there is provided a method for producing a connector by insert molding, said connector including: one terminal having a part-connecting portion to be connected to an anode of an electronic component; the other terminal having a part-connecting portion to be connected to a cathode of the electronic component; and a housing in which a pair of the terminals are embedded, said method including the steps of:

arranging the pair of terminals in cavities formed between a plurality of dies separable to each other and disposed along an outer shape of the connector, so that the part-connecting portions are disposed with a gap in the same plane;

arranging a positioning member in between the port connecting portions; and filling the cavities with meled synthetic resin to mold the housing.

Preferably, the positioning member is integrally formed with one of the dies.

Preferably, the positioning member is formed in a cylindrical shape.

Preferably, a plurality of positioning members is arranged with gaps.

Preferably, a close contact surface in close contact with surfaces of the part-connecting portions separated from each other is formed on any one of the dies.

According to another aspect of the present invention, there is provided a connector produced by the above-described method, wherein a hole concaved from a surface of the housing is formed on the connector in between the part-connecting portions by the positioning member.

Preferably, an exposed portion through which the surface of the part-connecting portion is exposed to an outside is formed on the housing of the connector by the close contact surface.

Preferably, the electronic component is an LED, and one of the pair of terminals includes the part-connecting portion and a battery-connecting portion connected to the part-connecting portion via a circuit component.

According to another aspect of the present invention, there is provided an illuminating device including:

the above-described connector;

an LED as the electronic component; and a bulb connector having a pair of terminal portions having electric-contact portions respectively connected to a pair of electrodes of a light bulb;

wherein the pair of terminals includes terminal-connecting portions respectively connected to the electric-contact portions of the pair of terminal portions.

Preferably, the terminal-connecting portion includes: a bottom plate; and a pressure-contact blade vertically extending from the bottom plate. Further, the pressure-contact blade is folded toward the bottom plate so that it is connected to the electric-contact portion.

According to another aspect of the present invention, there is provided an LED unit including:

an LED chip;

a conductive metallic bus bar;

a housing made of insulating synthetic resin;

an LED packaging portion formed on the bus bar, having a packaging surface on which the LED chip is packaged, and a non-packaging surface opposite to the packaging surface;

a heat-radiating opening formed on the housing with which the bus bar is integrally formed; and a heat-radiating space interposed between the non-packaging surface and the heat-radiating opening.

Preferably, a heat-radiating piece folded toward the non-packaging surface is coupled to the LED packaging portion, and exposed to a side of the housing.

Preferably, a wire-connecting portion for connecting an electric wire is formed on the bus bar, and a shock-absorbing portion for absorbing a shock generated by connecting the electric wire is formed between the wire-connecting portion and the LED packaging portion.

Preferably, the shock-absorbing portion is a folding portion of the bus bar of which upper side is continued to the LED packaging portion, and of which lower side is continued to the wire-connecting portion.

Preferably, a second heat-radiating space is formed under the wire-connecting portion.

These and other objects, features, and advantages of the present invention will become more apparent upon reading of the following detailed description along with the accompanied drawings.

DETAILED DESCRIPTION OF THE PREFERRED EMBODIMENTS

Hereinafter, a connector 1 according to an embodiment of the present invention will be explained with reference to FIGS. 1 to 12. The connector 1 composes a room-illuminating device 2 shown in FIGS. 1 and 2.

Figure 1:
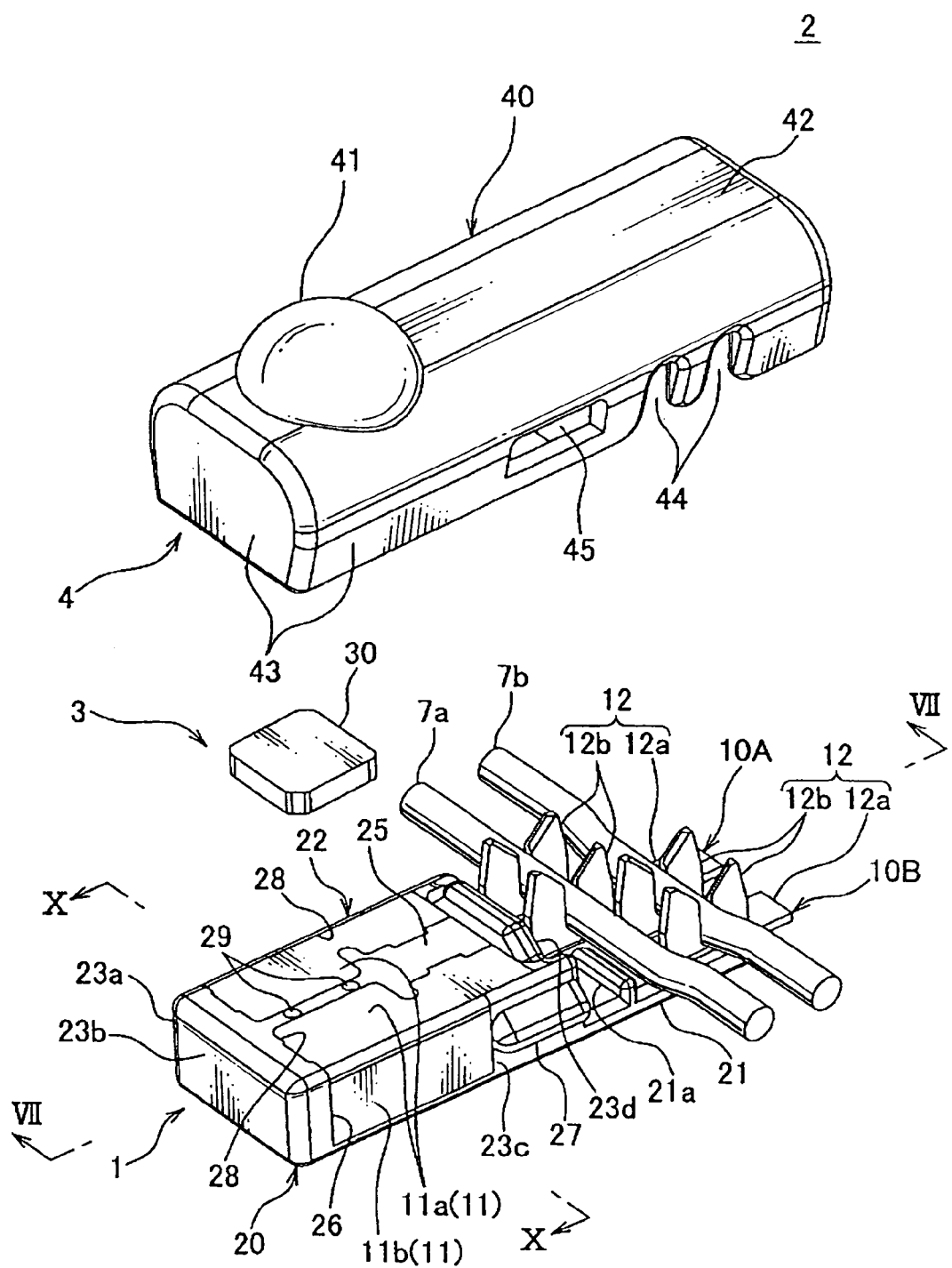
FIG. 1 is an exploded perspective view showing a room-illuminating device having a connector according to a first embodiment of the present invention.

The room-illuminating device 2 is, for example, a device for illuminating a cabin of a vehicle. As shown in FIG. 1, the room-illuminating device 2 includes: a connector 1; an LED (Light Emitting Diode) 3 as an electronic component; and a cover 4. The connector 1 is mounted on a roof panel of a vehicle. The connector 1 includes: a pair of terminals 10A, 10B; and a housing 20 in which the pair of terminals 10A, 10B is embedded.

Figure 3:
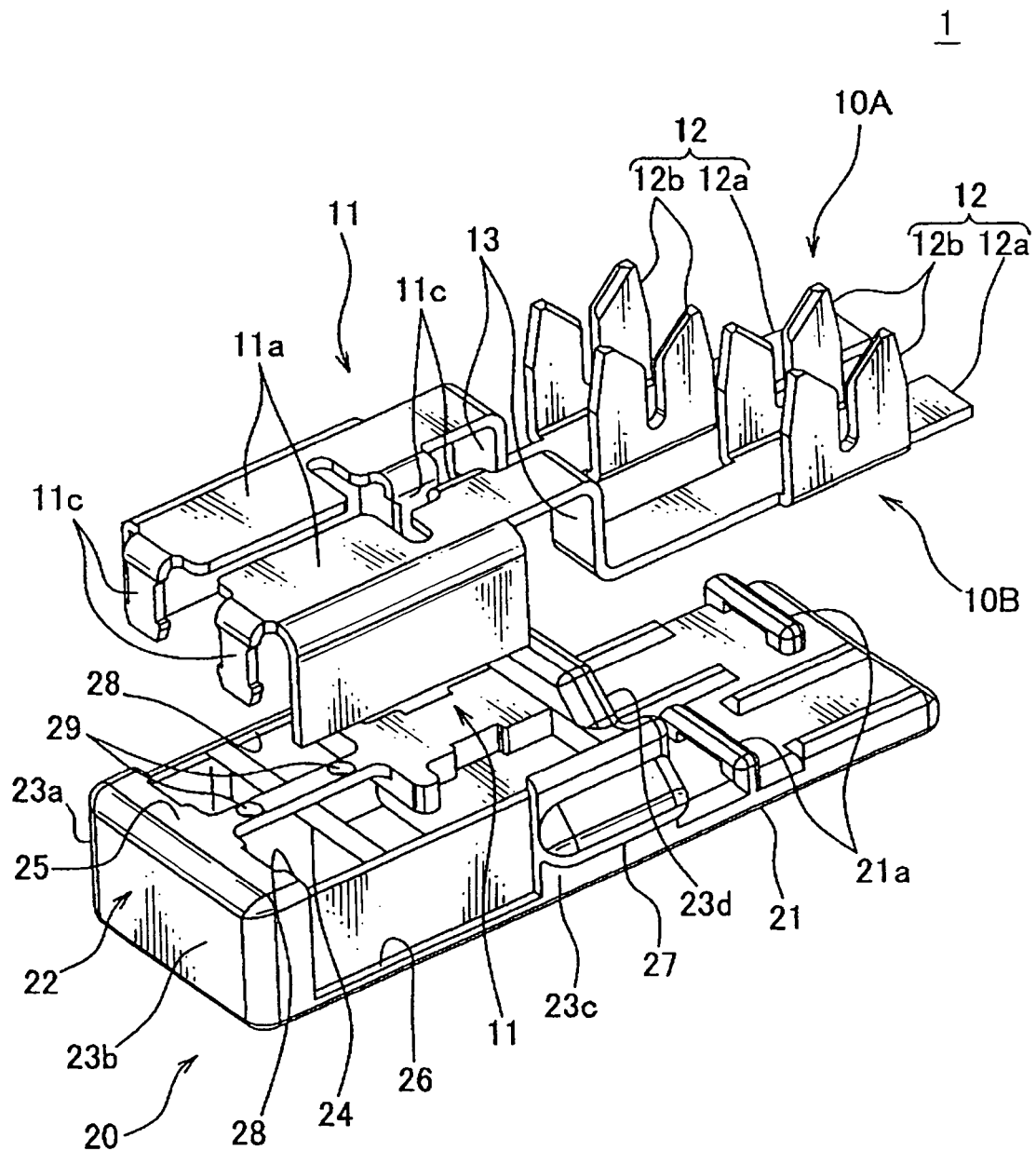
FIG. 3 is a perspective view showing separately terminals and a housing shown in FIG. 1.
Figure 4A:
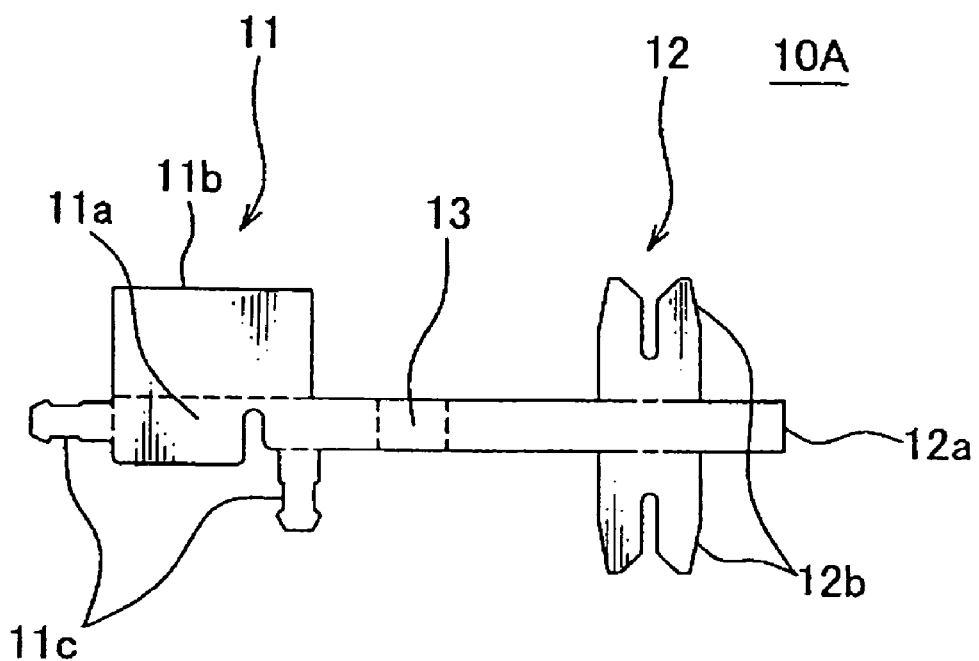
FIG. 4A is a development view showing one of the terminals shown in FIG. 3.

The terminal 10A is made by pressing a conductive metal plate. As shown in FIGS. 3 and 4A, the terminal 10A integrally includes: a part-connecting portion 11; a wire-connecting portion 12; and a coupling portion 13 to couple the part-connecting portion 11 to the wire-connecting portion 12. Incidentally, FIG. 3 is a perspective view showing the terminals 10A, 10B to be embedded in the housing 20 arranged at an upside of the housing 20.

The part-connecting portion 11 integrally includes: an upper plate 11a; a side plate 11b; and a support 11c. The upper plate 11a is formed in a rectangular plate shape. The side plate 11b is formed in a rectangular plate shape, and continuing from an outer edge of the upper plate 11a in a width direction thereof, and extending vertically from the outer edge. The two supports 11c respectively extend from the outer edge of the upper plate 11a near the coupling portion 13, and from the outer edge away from the coupling portion 13. A falling-out preventing piece formed in an anchor shape is formed at a tip end of the support 11c.

As shown in FIG. 1, while one surface of the upper plate 11a of the part-connecting portion 11 is exposed to an outside, the upper plate 11a is embedded in the housing 20. An anode 31 of the LED 3 is overlapped with the one surface of the upper plate 11a, so that the part-connecting portion 11 is connected to the anode 31 of the LED 3. Further, while one surface of the side plate 11b continuing from the one surface of the upper plate 11a is exposed to an outside, the side plate 11b is embedded in the housing 20.

As shown in FIGS. 3 and 4A, the wire-connecting portion 12 integrally includes: a bottom plate 12a; and a pressure-contact blade 12b. The bottom plate 12a is formed in a rectangular plate shape, and arranged parallel to the upper plate 11a via the coupling portion 13. A pair of pressure-contact blades 12b is provided, and extended vertically in the same direction from both edges of the bottom plate 12a in the width direction thereof. An electric wire 7a of a wiring harness arranged on the roof panel is in pressure-contact with the pressure-contact blade 12b. The terminal 10A electrically connects the electric wire 7a with the anode 31 of the LED 3.

The electric wire 7a and later-described electric wire 7b are so-called covered wires each including: a conductive core wire; and an insulating cover for covering the core wire. Each of electric wires 7a, 7b has a circular section. The electric wire 7a is connected to an anode of a battery mounted on a vehicle, and the other electric wire 7b is connected to a cathode of the battery.

As shown in FIG. 1, while one surface of the bottom plate 12a of the wire-connecting portion 12 as the same side of the one surface of the upper plate 11a is substantially exposed to an outside, the bottom plate 12a is embedded in the housing 20. Further, the pressure-contact blade 12b is projected from a surface of the housing 20, and exposed to an outside of the housing 20.

As shown in FIGS. 3 and 4A, the coupling portion 13 is formed in a rectangular plate shape, one end in a longitudinal direction is extended to the upper plate 11a of the part-connecting portion 11, the other end is extended to the bottom plate 12a of the wire-connecting portion 12 so that the coupling portion 13 couples the part-connecting portion 11 to the wire-connecting portion 12. The coupling portion 13 is perpendicular to both the upper plate 11a and the bottom plate 12a. The whole coupling portion 13 is embedded in the housing 20.

Figure 4B:
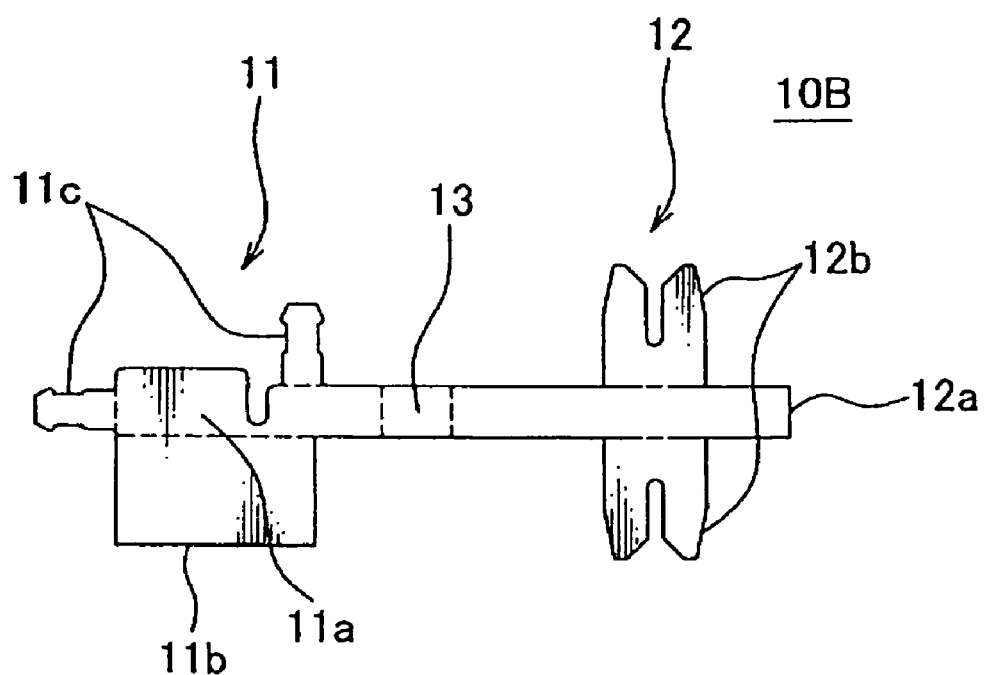
FIG. 4B is a development view showing the other of the terminals shown in FIG. 3.
Figure 5:
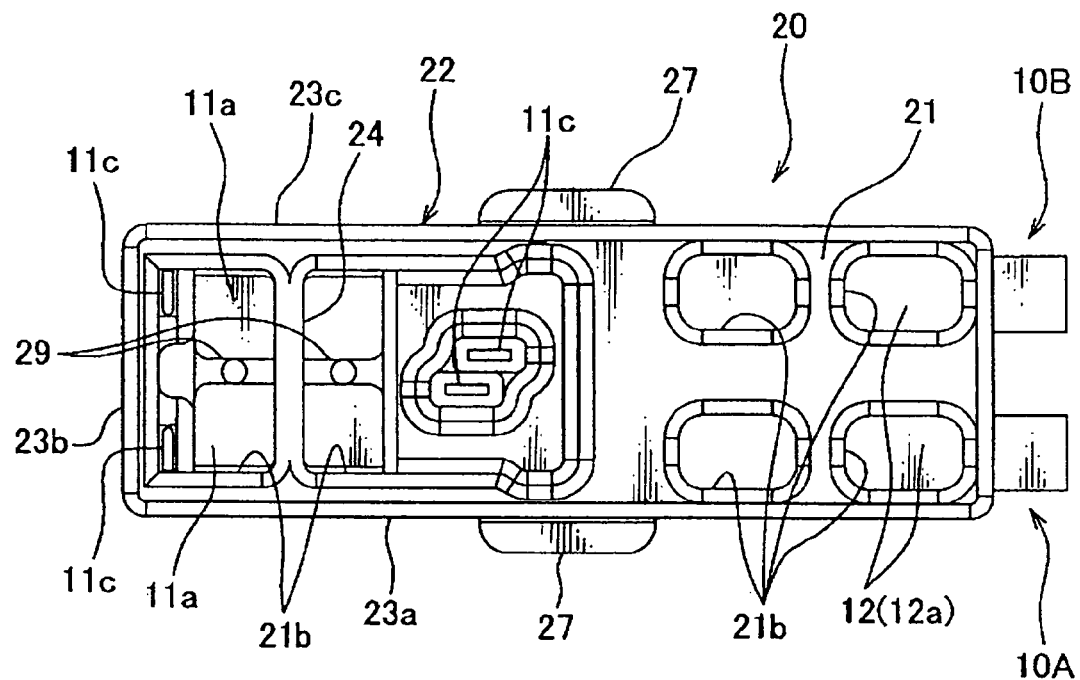
FIG. 5 is a bottom view showing the connector shown in FIG. 1.

The other terminal 10B is made by pressing a conductive metal plate. As shown in FIGS. 3 and 4B, the terminal 10B integrally includes: the part-connecting portion 11; the wire-connecting portion 12; and the coupling portion 13. The terminals 10B and 10A are mirror symmetric. The structures of the part-connecting portion 11, the wire-connecting portion 12, and the coupling portion 13 of the terminal 10B is the same as the terminal 10A except that the pressure-contact blade 12b of the terminal 10B is further away from the coupling portion 13 than that of the terminal 10A.

When the terminals 10A, 10B are embedded in the housing 20, the upper plate 11a of the terminal 10B is arranged in the same plane as the upper plate 11a of the terminal 10A with a gap. A cathode 32 of the LED 3 is overlapped with the one surface of the upper plate 11an of the part-connecting portion 11 of the terminal 10B, so that the part-connecting portion 11 is connected to the cathode 32 of the LED 3. Further, the electric wire 7b is in pressure-contact with the pressure-contact blade 12b of the terminal 10B. The terminal 10B electrically connects the electric wire 7b with the cathode 32 of the LED 3.

The housing 20 is made of insulating synthetic resin. As shown in FIGS. 1 and 3, the housing 20 includes: a rectangular plate-shaped bottom wall 21; and a box-shaped terminal-receiving portion 22 projected from a surface at one end in a longitudinal direction of the bottom wall 21. The terminals 10A, 10B are embedded in the housing so that the longitudinal direction of the terminals 10A, 10B are parallel to the longitudinal direction of the bottom wall 21. Further, the terminals 10A, 10B are embedded in the housing so that the part-connecting portions 11 of the terminals 10A, 10B are arranged in the same plane with a gap. The part-connecting portions 11 of the terminals 10A, 10B are arranged at one end in the longitudinal direction of the bottom wall 21 of the housing 20, and the wire-connecting portions 12 of the terminals 10A, 10B are arranged at the other end of the bottom wall 21.

The bottom plate 12a is embedded at the other end in the longitudinal direction of the bottom wall 21 while one surface of the bottom plate 12a of the wire-connecting portion 12 is exposed to an outside. Further, the pressure-contact blade 12b is projected on a surface of the bottom wall 21 at the other end. Further, a guide rib 21a for guiding the electric wire 7 in pressure-contact with the pressure-contact blade 12b is extended on the surface of the bottom wall in a width direction of the bottom wall 21. Further, a plurality of holes 21b (FIG. 5) are formed in the bottom wall 21 by projections 52c, 52d of a later-described lower die.

The terminal-receiving portion 22 includes: three peripheral walls 23a, 23b, 23c extending vertically from an outer edge at one end in the longitudinal direction of the bottom wall 21; one peripheral wall 23d extending vertically from the center of the bottom wall 21 and coupled to the peripheral walls 23a, 23c; a partition wall (FIG. 3) connecting the peripheral walls 23a, 23c to each other; and an upper wall 25 continued to the peripheral walls 23a, 23b, 23c, 23d and the partition wall 24. An outer shape of the terminal-receiving portion 22 is a rectangular box shape. The peripheral walls 23a, 23c are arranged parallel to each other with a gap. The peripheral walls 23b, 23d, and the partition wall 24 are arranged parallel to each other with a gap. The upper wall 25 is arranged perpendicular to the peripheral walls 23a, 23b, 23c, 23d and the partition wall 24, and parallel to the bottom wall 21.

The side plates 11b of the pair of terminals 10A, 10B are respectively embedded in the peripheral walls 23a, 23c, while the one surfaces of the side plates 11b are exposed to an outside. The side plate 11b is exposed to the outside via an exposure hole 26. The exposure holes 26 are formed respectively on the peripheral walls 23a, 23c, and have a rectangular shape in a plan view. The exposure hole 26 is formed in the housing 20 by closely contacting the one surface of the side plate 11b with a later-described upper die 53.

Further, a locking projection 27 for engaging with the cover 4 is projected in the vicinity of the exposure hole 26. The one supports 11c of the terminals 10A, 10B are embedded in the peripheral wall 23b. The whole coupling portions 13 of the terminals 10A, 10B are embedded in the peripheral wall 23d.

The upper plates 11a of the terminals 10A, 10B are embedded in the upper wall 25, while the one surfaces of the upper plates 11a are exposed to an outside. The upper plate 11a is exposed to the outside via an exposure hole 28. A pair of exposure holes 28 is provided, and a planar shape of the exposure hole 28 is substantially same as an outer shape of the one surface of the upper plate 11a. The exposure hole 28 communicates with the exposure hole 26. One exposure hole 28 exposes one upper plate 11a.

Further, a pair of holes 29 drilled by projections 54 of the later-described upper die penetrates between the pair of exposure holes 28. A planar shape of the hole 29 is a circular shape. The hole 29 is concaved from a surface of the upper wall 25, namely, a surface of the housing 20, and penetrates the upper wall 25. The pair of holes 29 is arranged in a longitudinal direction of the upper wall 25 with a gap.

In the connector 1, the terminals 10A, 10B are embedded in the housing 20. Conventionally, a connector including: a pressure-contact terminal having the pressure-contact blade 12b; and a connector housing to which the pressure-contact terminal is attached is known. A plurality of terminal-receiving portions such as groove-shaped portions for receiving the pressure-contact terminals is provided on the housing. However, the pressure-contact terminals are not completely attached to all of the terminal-receiving portions, and only partially attached to the terminal-receiving portions as necessary.

Thus, in the conventional connector, the pressure-contact terminal to be used is not predetermined, and cannot be embedded. On the contrary, in the connector 1 used in the room-illuminating device 2 of this embodiment, the terminal 10A to be connected to the anode 31 of the LED 3 and the terminal 10B to be connected to the cathode 32 of the LED 3 are surely used, and can be embedded in the housing 20.

Figure 6:
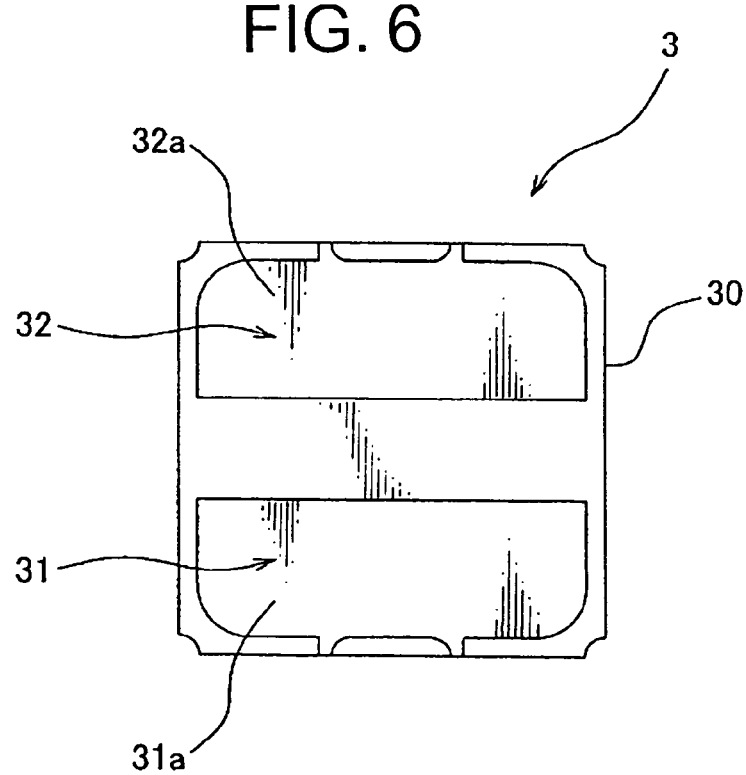
FIG. 6 is a bottom view showing an LED shown in FIG. 1.

The LED 3 is a surface-mounted LED. As shown in FIGS. 1 and 6, the LED 3 includes: an LED main body 30 in which an LED chip is embedded; the anode 31; and the cathode 32 (only shown in FIG. 6). The LED main body 30 is formed in a substantially square shape in a plan view, and in a thick plate shape. The LED chip, the anode 31, and the cathode 32 are sealed in the LED main body 30.

In each of the anode 31 and the cathode 32, one end is connected to the LED chip, and the other end is connected to each of the terminals 10A, 10B. As shown in FIG. 6, end walls 31a, 32a of the other ends of the anode 31 and the cathode 32 are exposed to an outside via one surface of the LED main body 30. These end walls 31a, 32a are flat and arranged in the same plane with a gap.

In the LED 3, the light of the LED chip emits toward a lens 41 from the other surface opposite to the one surface via the LED main body 30. Further, the end walls 31a, 32a of the anode 31 and the cathode 32 are respectively overlapped with the one surface of the upper plates 11a of the part-connecting portions 11 of the terminals 10A, 10B, and soldered so that the LED 3 is connected to the part-connecting portion 11.

Figure 2:
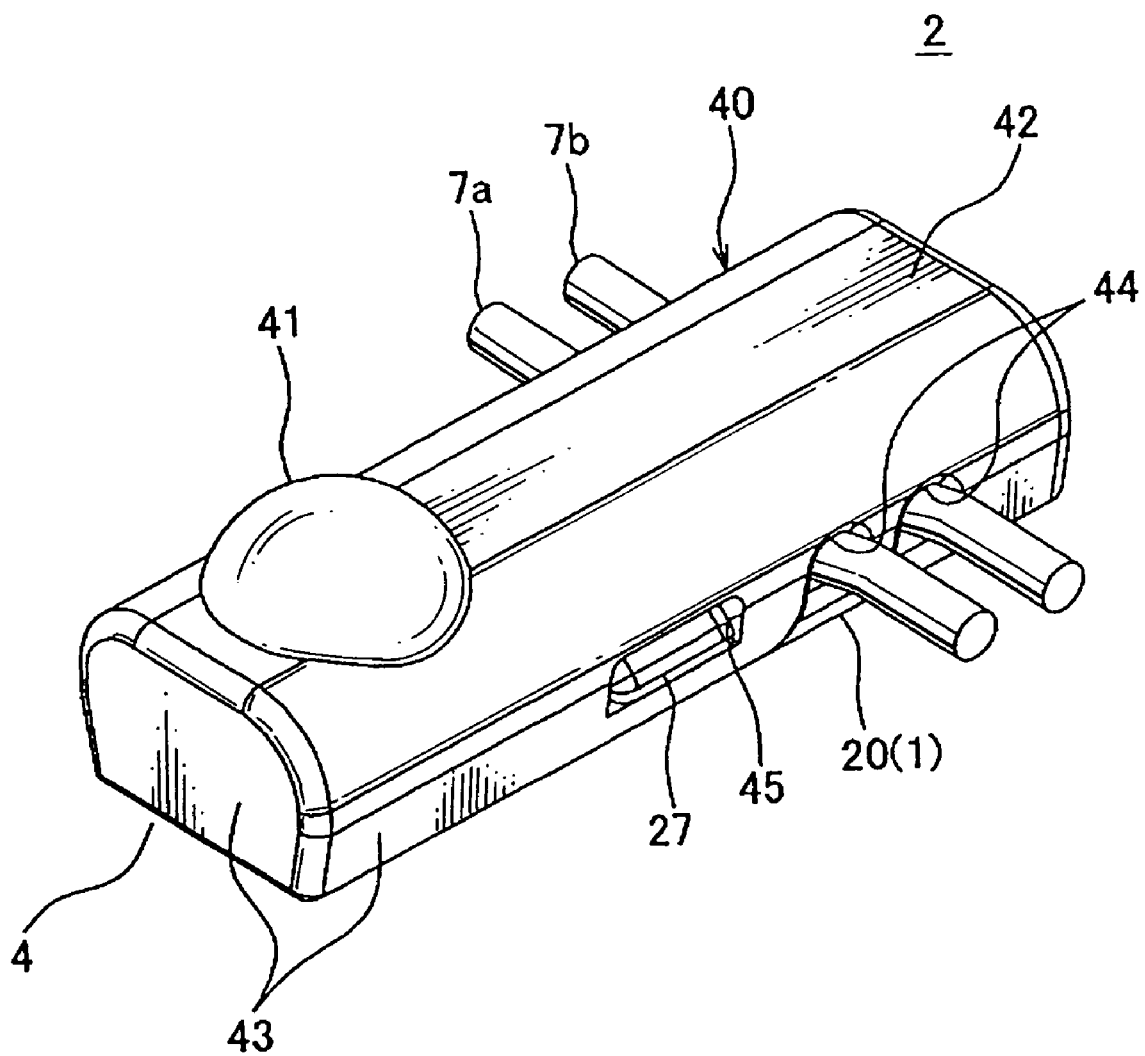
FIG. 2 is a perspective view showing the room-illuminating device of FIG. 1 which is assembled.

As shown in FIGS. 1 and 2, the cover 4 integrally includes: a cover main body 40; and the lens 41. The cover 4 is made by injection molding such as two-color molding. The cover main body 40 is made of light-blocking synthetic resin. The cover main body 40 includes: a substantially rectangular plate shaped upper wall 42; and a plurality of peripheral walls 43 extending vertically from an outer edge of the upper wall 42. The cover main body 40 is formed in a box shape having an opening in one direction.

Two grooves 44 for passing the electric wires are formed on each of a pair of peripheral walls 43 extending from both ends of the upper wall 42 in a width direction thereof. The grooves 44 are made by notching the peripheral walls 43 from an edge toward the upper wall 42, and arranged with a gap. Further, locking holes 45 for engaging with the locking projections 27 in the connector 1 respectively penetrate the pair of peripheral walls 43 at the center in the longitudinal direction thereof.

The lens 41 is made of translucent synthetic resin, and formed in a hemispherical shape. The lens 41 is buried at one end away from the grooves 44 on the upper wall 42, and projected from an outer surface of the upper wall 42. The lens 41 faces the LED 3 connected to the connector 1, and guides the light emitted from the LED 3 to an outside of the cover 4.

The connector 1 is made by insert molding using an injection molding machine 5. As shown in FIGS. 7 to 12, the injection molding machine 5 includes: a die unit 50; an injection unit 60; and a not-shown controller. The die unit 50 includes: a base 51; a pair of dies 52, 53; a projection 54 as a positioning member; and an elevating cylinder 55. The base 51 is installed on such as a floor of a factory, and an upper surface of the base 51 is formed flat.

A lower die 52 of a pair of dies 52, 53 is mounted on the upper surface of the base 51. The lower die 52 includes: a box-shaped main body 52a; and a concave 52b concaved from a surface of the main body 52a facing an upper die 53. A shape of the concave 52b corresponds to an outer shape of the connector 1 at a lower part of FIG. 1. The pair of terminals 10A, 10B is arranged in an interior of the concave 52b.

Figure 10:
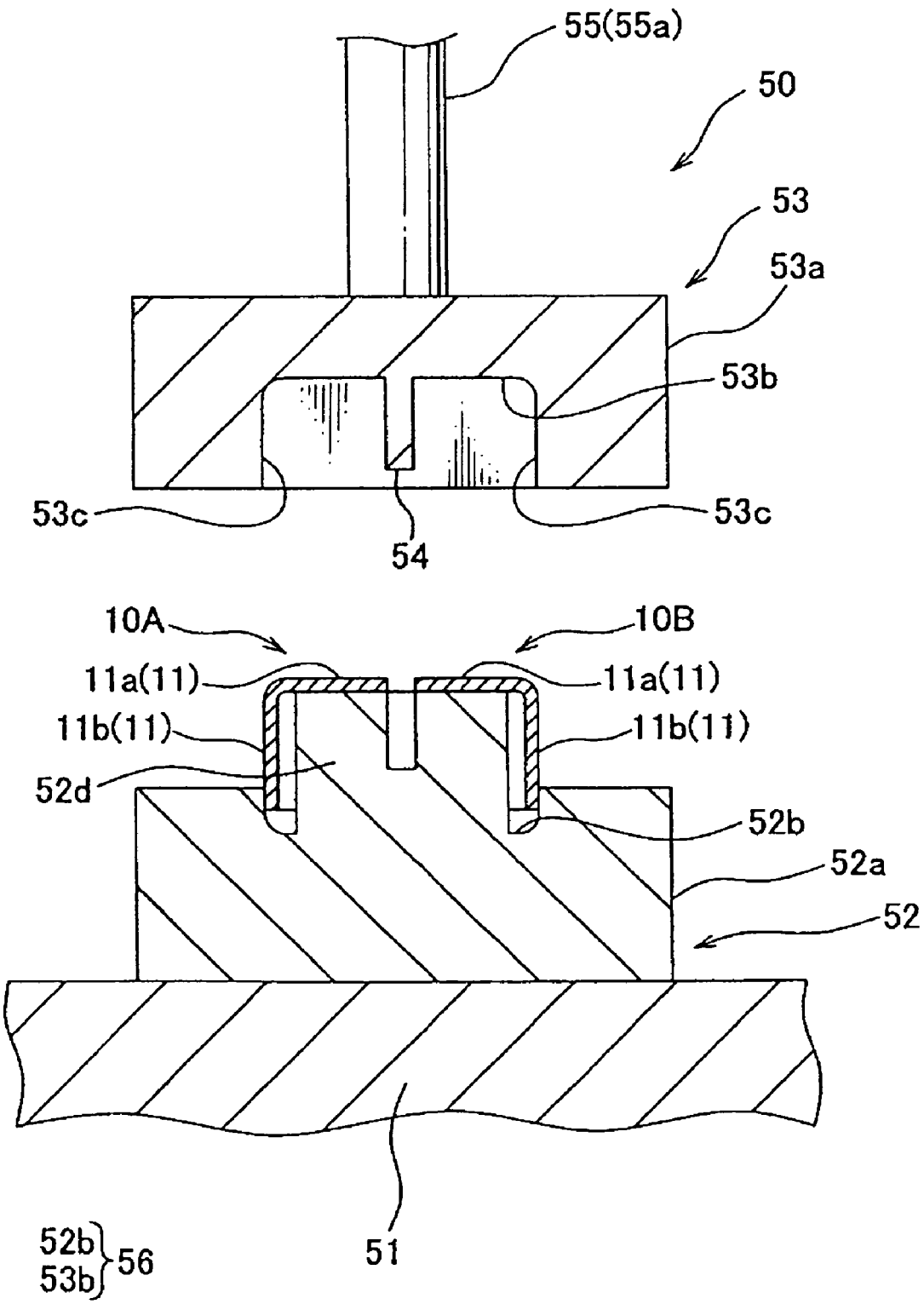
FIG. 10 is a sectional view taken on line X-X of FIG. 1 showing the upper and lower dies shown in FIG. 7 positioned at the open position.

As shown in FIG. 10, a width of the concave 52b for arranging the terminals 10A, 10B is wider than widths of the terminals 10A, 10B. Therefore, the terminals 10A, 10B can be arranged with a gap in the concave 52b.

Figure 7:
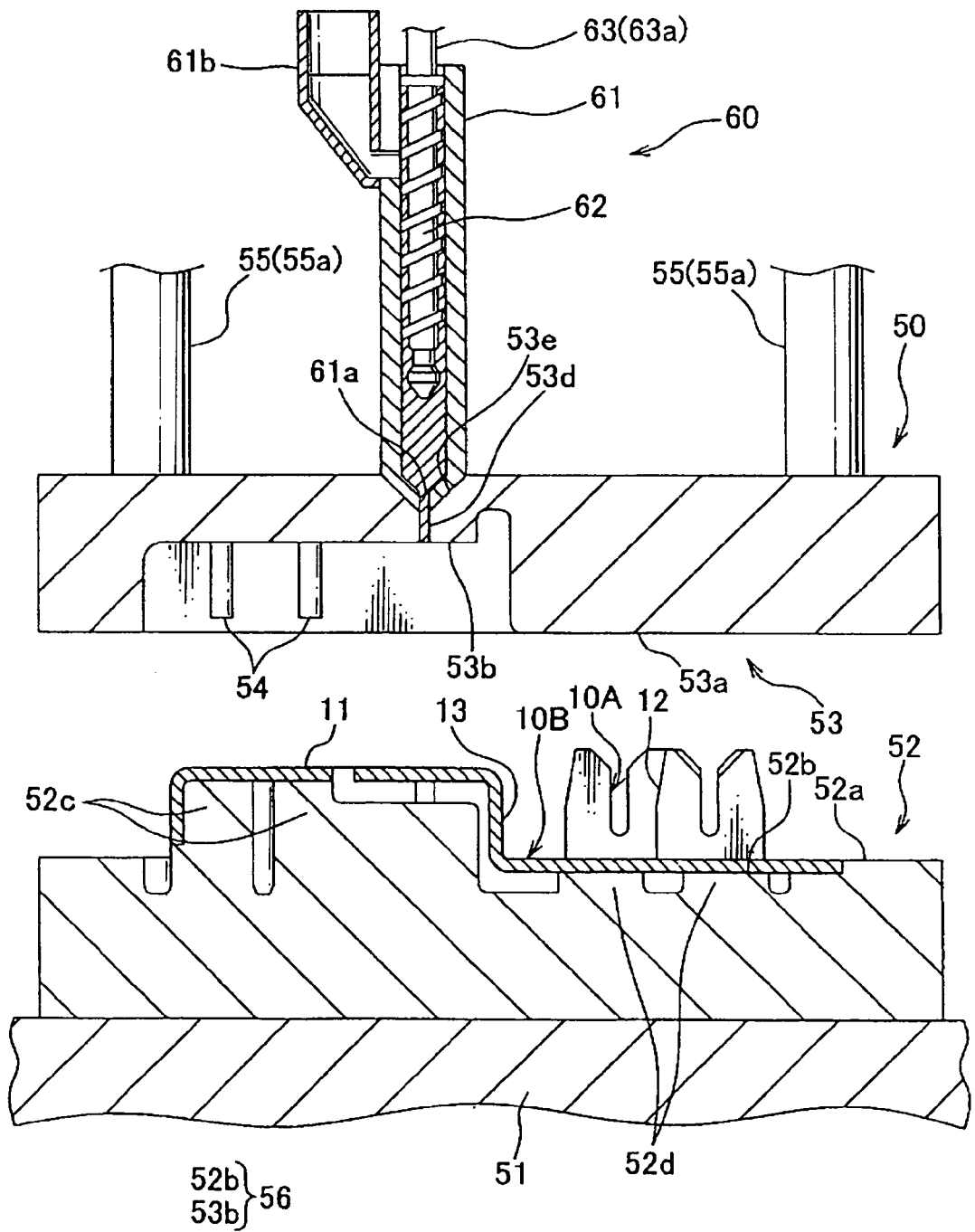
FIG. 7 is a sectional view taken on line VII-VII of FIG. 1 showing an upper die and a lower die positioned at an open position for producing the connector shown in FIG. 1.

Further, as shown in FIG. 7, a plurality of projections 52c, 52d are projected from an inner wall (bottom wall) of the concave 52b. The projections 52c (two in FIG. 7) are arranged with a gap in the longitudinal direction of the concave 52b. Tip ends of the projections 52c are arranged in the same plane. The upper plates 11a of the part-connecting portions 11 of the terminals 10A, 10B are respectively overlapped with the tip ends of the projections 52c.

Two projections 52d are arranged with a gap in the longitudinal direction of the concave 52b, and two rows of the projections 52d are arranged with a gap in a width direction of the concave 52b. Tip ends of the projections 52d are arranged in the same plane. The bottom plates 12a of the wire-connecting portions 12 of the terminals 10A, 10B are respectively overlapped with the tip ends of the projections 52d. The terminals 10A, 10B can be arranged in the same plane in the concave 52b due to the projections 52c, 52d.

The upper die 53 includes: a box-shaped main body 53a; and a concave 53b concaved from a surface of the main body 53a facing the lower die 52. A shape of the concave 53b corresponds to an outer shape of the connector 1 at an upper part of FIG. 1. The upper die is elevatably arranged over the lower die 52.

Figure 11:
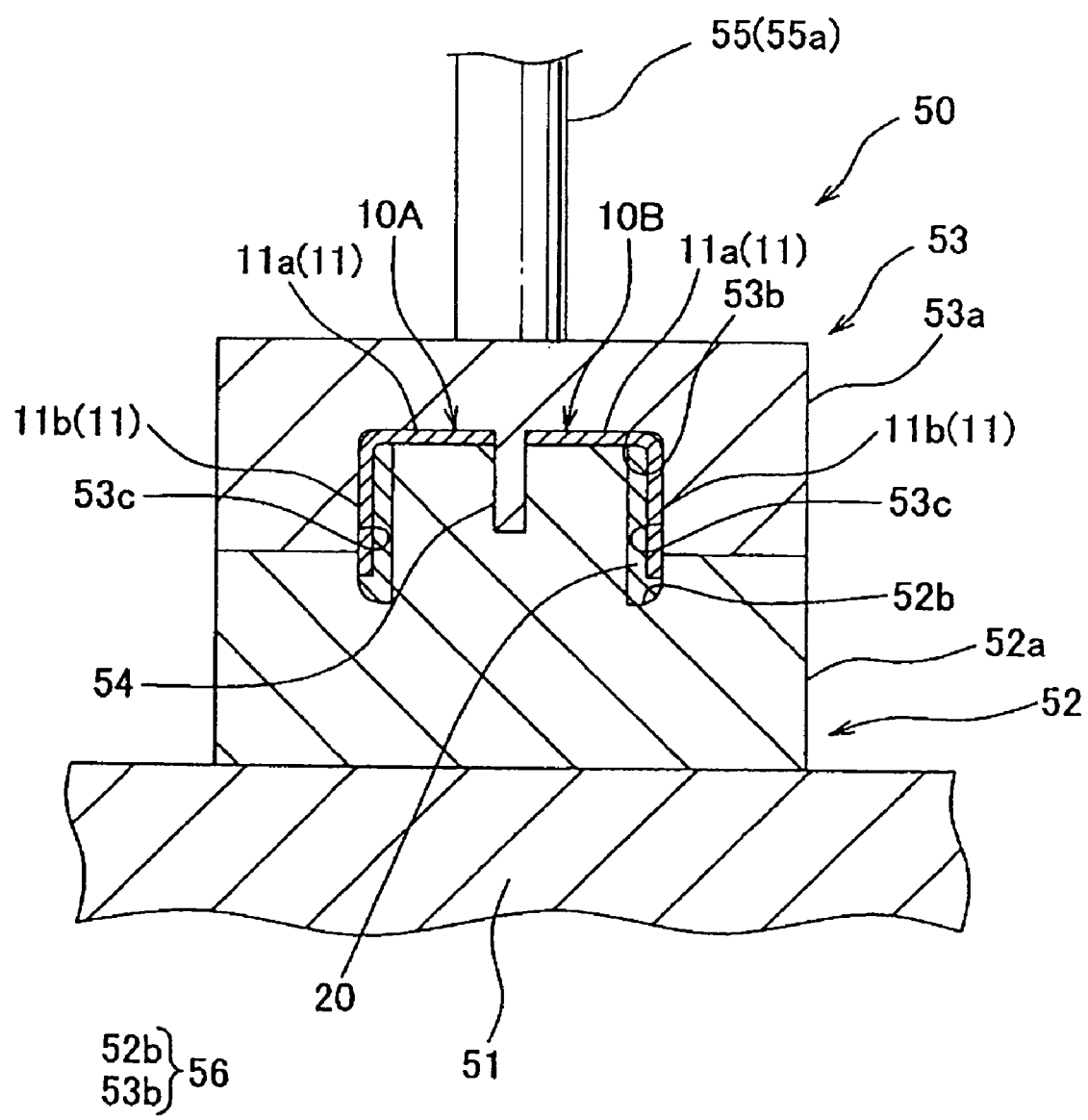
FIG. 11 is a sectional view showing the upper and lower dies shown in FIG. 10 positioned at the close contact position.

As shown in FIG. 11, close-contact surfaces 53c for close-contacting the one surfaces (the surfaces of the part-connecting portions 11 away from each other) of the side plates 11b of the terminals 10A, 10B are partially provided on an inner wall of the concave 53b of the upper die 53. Close-contacting the close-contact surfaces 53c with the side plates 11b prevents the terminals 10A, 10B in a later-described cavity 56 from separating from each other over a specific distance. Further, a part of the inner wall of the concave 53b of the upper die 53 is so formed as to close-contact the one surfaces of the upper plates 11a and the bottom plates 12a of the terminals 10A, 10B.

Further, a sprue runner 53d continued to the concave 53b, and an injection hole 53e communicating with the sprue runner 53d are provided in the upper die 53. The sprue runner 53d is a through-hole penetrating the main body 53a of the upper die 53. The injection hole 53e is formed on a surface of the upper die 53 away from the lower die 52, and communicates with the sprue runner 53d.

The cavity 56 is provided between the upper and lower dies 52, 53. The cavity 56 is a space formed by communicating the concave 52b of the lower die 52 with the concave 53b of the upper die 53 when the upper and lower dies 52, 53 closely contact with each other.

Figure 8:
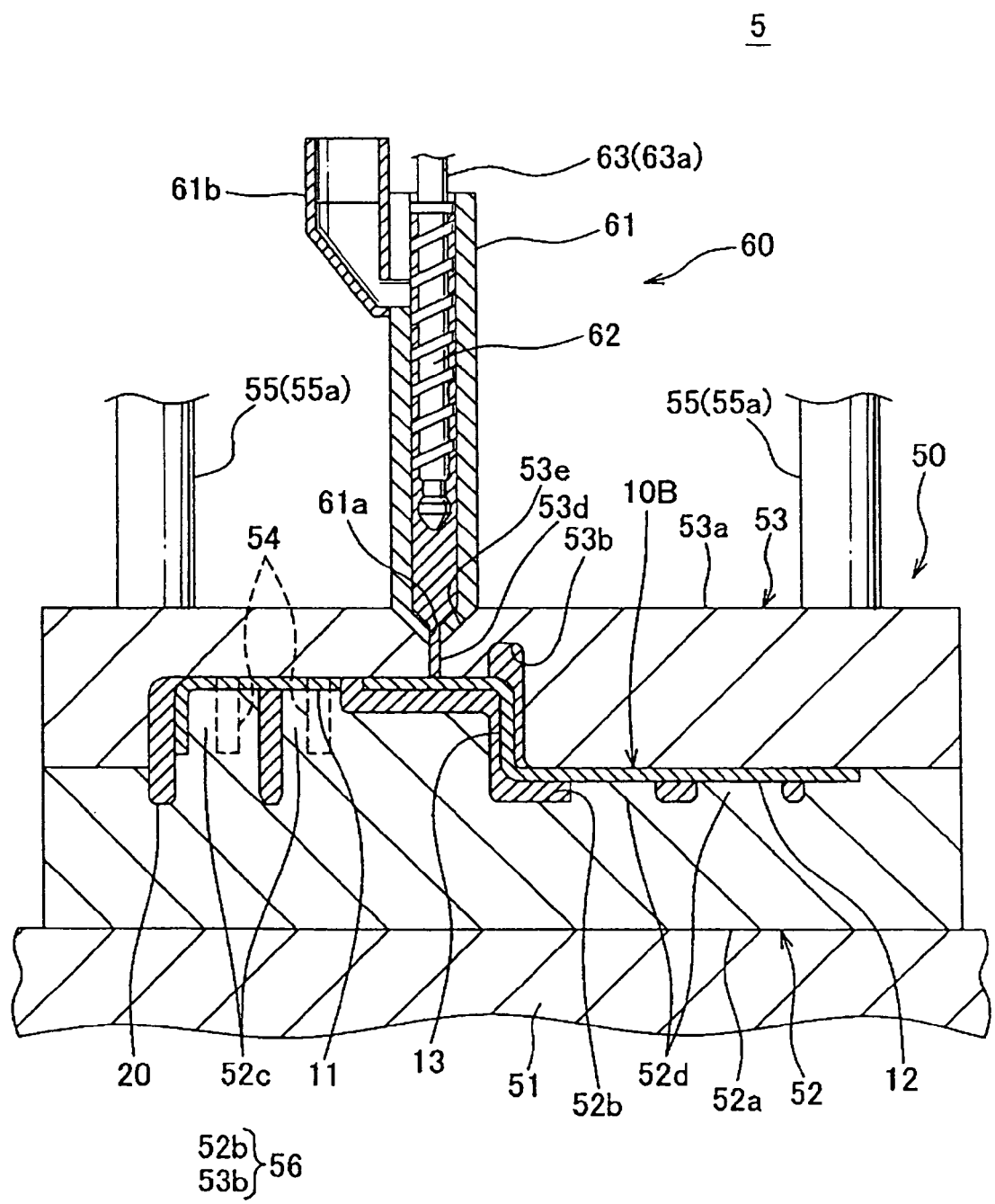
FIG. 8 is a sectional view showing the upper and lower dies shown in FIG. 7 positioned at a close contact position.
Figure 9:
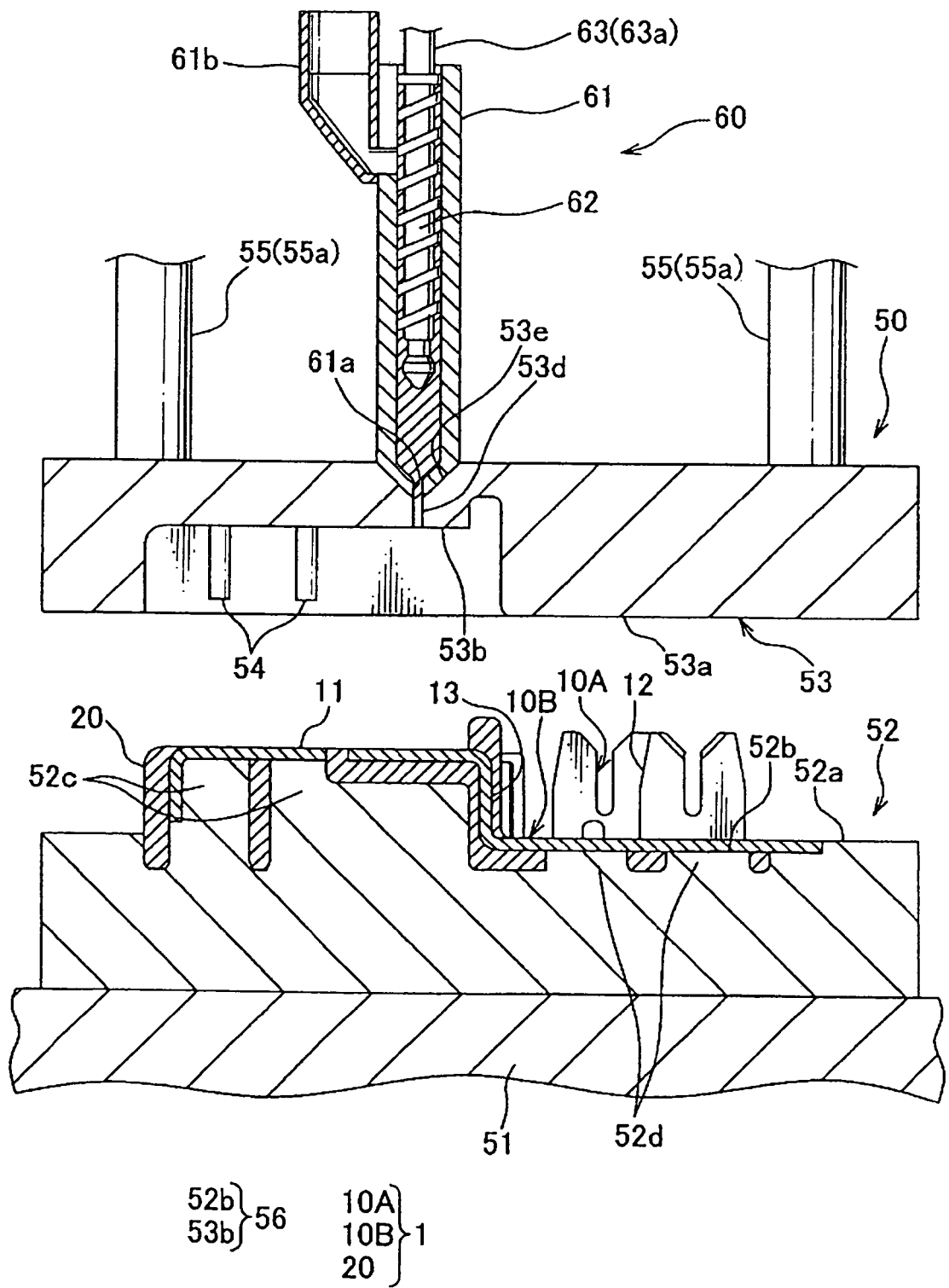
FIG. 9 is a sectional view showing the upper and lower dies shown in FIG. 8 positioned at the open position again.
Figure 12:
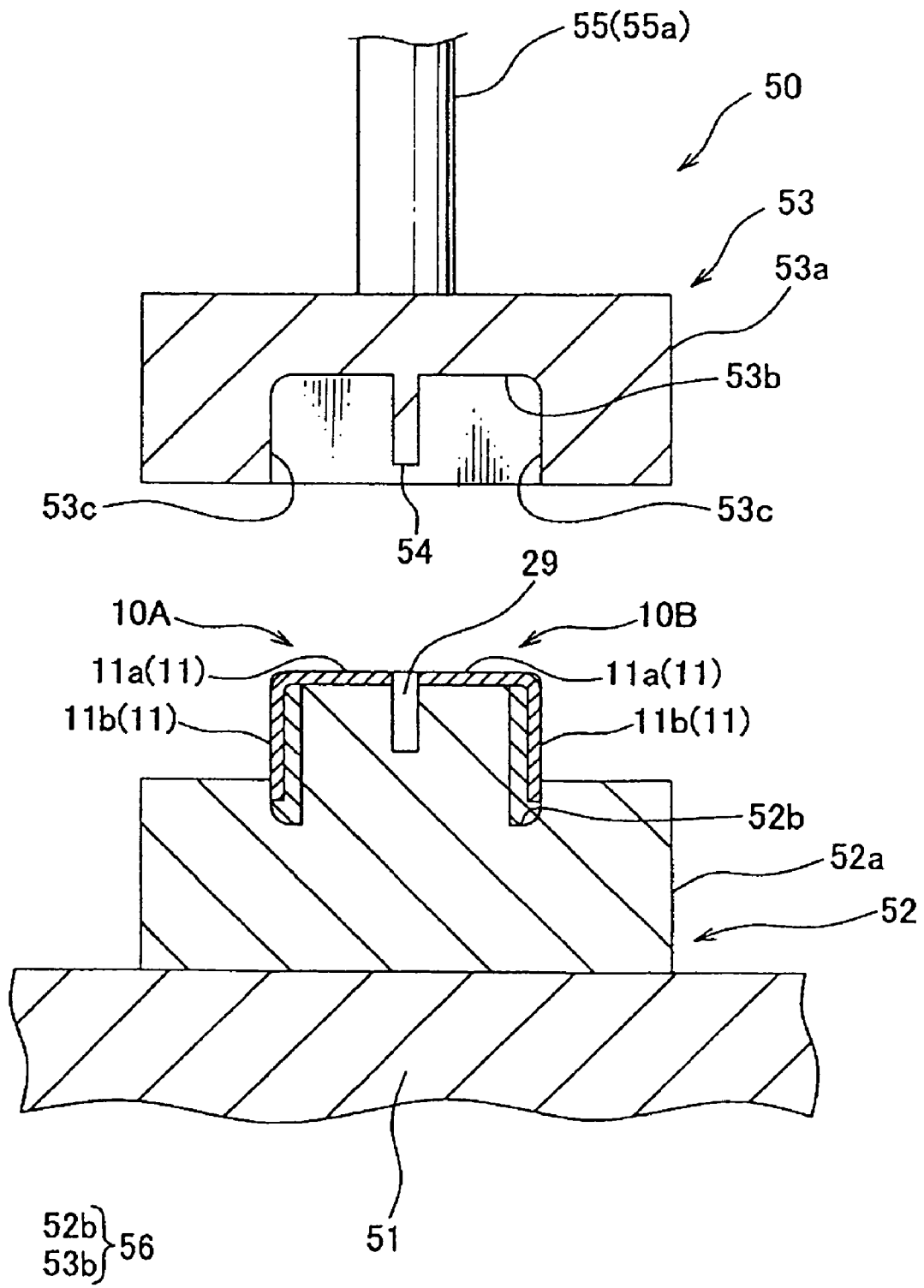
FIG. 12 is a sectional view showing the upper and lower dies shown in FIG. 11 positioned at the open position again.

A shape of the cavity 56 corresponds to the outer shape of the connector 1. When the cavity 56 is filled with the synthetic resin as the molding material, the housing 20 is molded. When a rod 55a of the later-described elevating cylinder 55 is moved up and down, the upper die 53 and the lower die 52 are positioned in a closed position for sealing the cavity 56 (FIGS. 8, 11) and in an open position for opening the cavity 56 (FIGS. 9, 10, 12).

As shown in FIGS. 7 to 12, a plurality of projections 54 is integrally formed with the upper die 53, and projected from an inner wall of the concave 53b of the upper die 53 toward the lower die 52. The projections are in a cylinder shape, and arranged with a gap in a longitudinal direction of the upper die 53. An outer diameter of the projection 54 is substantially the same as a difference between the width of the concave 52b of the lower die 52 and the widths of the terminals 10A, 10B.

As shown in FIG. 11, when the upper die 53 is moved close to the lower die 52, the projection 54 is inserted into between the upper plates 11a of the part-connecting portions 11 of the pair of terminals 10A, 10B arranged on the lower die 52. The projection 54 closely contacts the outer edges of the upper plates 11a facing each other, and prevents the terminals 10A, 10B in the cavity 56 from moving close to each other within a specific distance.

The elevating cylinder 55 includes: a not-shown cylinder main body; and the rod 55a extendable from the cylinder main body. The cylinder main body is attached to the base 51 with a support column extending vertically from an upper wall of the base 51, and positioned over the upper die 53. The rod 55a is attached to the upper die 53. When the rod 55a is expanded, the upper die 53 is moved close to the lower die 52. When the rod 55a is contracted, the upper die 53 is moved away from the lower die 52.

The injection unit 60 includes: a heating cylinder 61; a screw 62; and a pressing cylinder 63. The heating cylinder 61 is formed in a tubular shape, and a longitudinal direction of the heating cylinder 61 is parallel to the moving direction of the upper die 53. One end of the heating cylinder 61 is formed in a tapered shape. The heating cylinder 61 is attached to the upper die in a state that an opening 61a at the one end of the heating cylinder 61 is inserted into the injection hole 53e of the upper die 53. Incidentally, the one end of the heating cylinder 61 closely contacts an inner wall of the injection hole 53e.

The heating cylinder 61 receives the screw 62. A plurality of heaters is attached to a surface of the heating cylinder 61. Further, a tubular hopper 61b is attached to the heating cylinder 61. The heating cylinder 61 is filled with chip-shaped synthetic resin as the molding material via the hopper 61b. The heating cylinder 61 melts the filled chip-shaped synthetic resin. Thus, the heating cylinder 61 is filled with the melted synthetic resin. Further, the heating cylinder 61 can inject the melted synthetic resin into the cavity 56 via the opening 61a, the injection hole 53e and the sprue runner 53d.

The screw 62 is formed in a bar shape, and received in the heating cylinder 61. A longitudinal direction of the screw 62 is parallel to the longitudinal direction of the heating cylinder 61. Further, the screw 62 is movable in the longitudinal direction of the heating cylinder 61. A spiral projection is formed on an outer peripheral wall of the screw 62. When the screw 62 is moved in the longitudinal direction, the melted synthetic resin in the heating cylinder 61 is moved to the one end of the heating cylinder 61 so that the melted synthetic resin in the heating cylinder 61 is injected to the injection hole 53e.

The pressing cylinder 63 includes: a cylinder main body; and a rod 63a extendable from the cylinder main body. The rod 63a is attached to the screw 62. When the rod 63a is extracted, the screw 62 is moved in the longitudinal direction of the heating cylinder 61. When the rod 63a is extracted, the screw 62 is moved close to the opening 61a at the one end of the heating cylinder 61. When the rod 63a is contracted, the screw 62 is moved away from the opening 61a.

In the injection unit 60, when the rod 63a of the pressing cylinder 63 is extracted, the screw 62 is moved in the longitudinal direction of the heating cylinder 61, and the melted synthetic resin in the heating cylinder 61 is injected into the cavity 56 via the injection hole 53e and the sprue runner 53d.

The controller is a computer having well-known RAM, ROM, and CPU. The controller stores a program to operate the injection molding machine 5. The controller is connected to the die unit 50 and the injection unit 60, and controls these based on the program to control the whole injection molding machine 5.

When producing the connector 1 using the injection molding machine 5, firstly, the upper and lower dies 53, 52 are positioned in the open position, and the terminals 10A, 10B are arranged on the lower die 52 (FIGS. 7 and 10). At this time, as shown in FIG. 3, the terminals 10A, 10B are arranged in the same direction parallel to each other, and the part-connecting portions 11 of the terminals 10A, 10B are arranged in the same plane with a gap.

Then, while the screw 62 is away from the opening 61a of the heating cylinder 61, the heating cylinder 61 is filled with the melted synthetic resin, and the controller expands the rod 55a of the elevating cylinder 55 to closely contact the upper die 53 with the lower die 52 and to position the upper and lower die 53, 52 in the closed position, thereby the cavity 56 is closed. Then, the controller expands the rod 63a of the pressing cylinder 63 to inject the melted synthetic resin in the heating cylinder 61 into the cavity 56 via the injection hole 53e and the sprue runner 53d. Thus, the cavity 56 is substantially filled with the melted synthetic resin (FIGS. 8 and 11).

Then, after confirming that the cavity 56 is filled with the synthetic resin, the controller keeps the rod 63a of the pressing cylinder 63 expand in a specific time. Then, in the specific time, the synthetic resin in the cavity 56 becomes hardened, and the housing 20 in which the terminals 10A, 10B are embedded is molded. After the specific time, the controller contracts the rod 63a of the pressing cylinder 63, and contracts the rod 55a of the elevating cylinder 55 to move the upper die 53 toward the open position (FIGS. 9 and 12). Then, the connector 1 is ejected from the lower die 52. Thus, the connector 1 is produced.

Then, the anode 31 and the cathode 32 of the LED 3 are respectively overlapped with the upper plates 11a of the part-connecting portion 11 of the terminals 10A, 10B exposed to the outside of the connector 1, and soldered to connect the LED 3 with the terminals 10A, 10B. Further, the electric wires 7a, 7b respectively come in pressure-contact with the wire-connecting portions 12 of the terminals 10A, 10B to connect the electric wire 7a, 7b with the terminals 10A, 10B. Lastly, the cover 4 is moved close to the connector 1 as to cover the LED 3, and the locking projection 27 is engaged with the locking hole 45 to attach the cover 4 onto the connector 1. Thus, the room-illuminating device 2 shown in FIG. 2 is assembled.

According to this embodiment, the pair of terminals 10A, 10B is embedded in the housing 20 while the projection 54 is interposed between the part-connecting portions 11 of the terminals 10A, 10B. Therefore, the gap between the part-connecting portions 11 is surely equal to or more than the specific distance. Thus, when the LED 3 is connected to the terminals 10A, 10B, a short circuit of the LED 3 is prevented. Further, because the upper plates 11a of the part-connecting portions 11 of the terminals 10A, 10B are formed in a plate shape, and arranged in the same plane, the LED 3 can be easily connected to the part-connecting portions 11.

Further, when the upper die 53 is moved close to the lower die 52, the projection 54 is simultaneously positioned between the part-connecting portions 11. Therefore, there is no need for an independent work to position the projection in between the part-connecting portions 11, and workability is increased.

Further, because the projection 54 is formed in a cylinder shape, a contact area with the part-connecting portion 11 becomes small. Therefore, the projection 11 can be smoothly positioned between the part-connecting portions 11.

Further, because the part-connecting portion 11 contacts a plurality of projections 54, the part-connecting portion 11 does not rotate about the projection 54. Therefore, the gap between the part-connecting portions 11 can be surely equal to or more than the specific distance.

Further, because the pair of terminals 10A, 10B is embedded in the housing 20 while the surfaces of the part-connecting portions 11 away from each other are in close contact with the close-contact surfaces 53c of the upper die 53. Therefore, the gap between the part-connecting portions 11 can be surely the specific distance.

In this embodiment, the electronic component is the LED 3. However, other electronic component can be used. Further, the connector 1 is used in the room-illuminating device 2. However, the connector 1 can be used in the other purpose.

Further, in this embodiment, the projections 54 are formed integrally with the upper die 53. However, the projections 54 may be formed with the lower die 52. Further, some projections 54 may be formed with the upper die 53, and the other projections 54 may be formed with the lower die 52. Further, the projections 54 may be formed separately from the upper and lower dies 53, 52.

Further, in this embodiment, the projection is formed in a cylinder shape. However, the projection 54 may be formed in a polygonal column shape. Further, in this embodiment, two projections 54 are used. However, three projections 54 may be used, and one projection 54 may be used which is not preferable.

Figure 14:
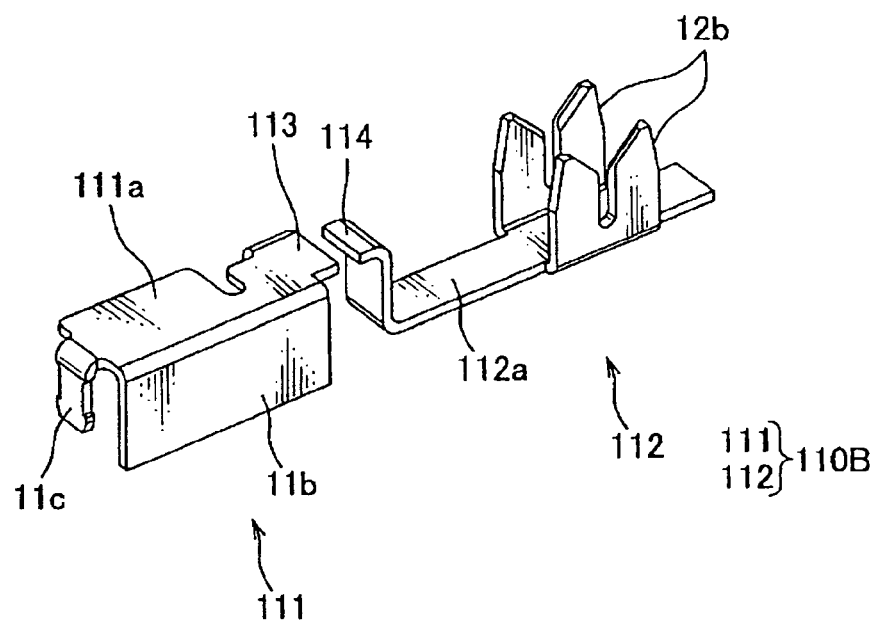
FIG. 14 is a perspective view showing the other terminal shown in FIG. 13.
Figure 15:
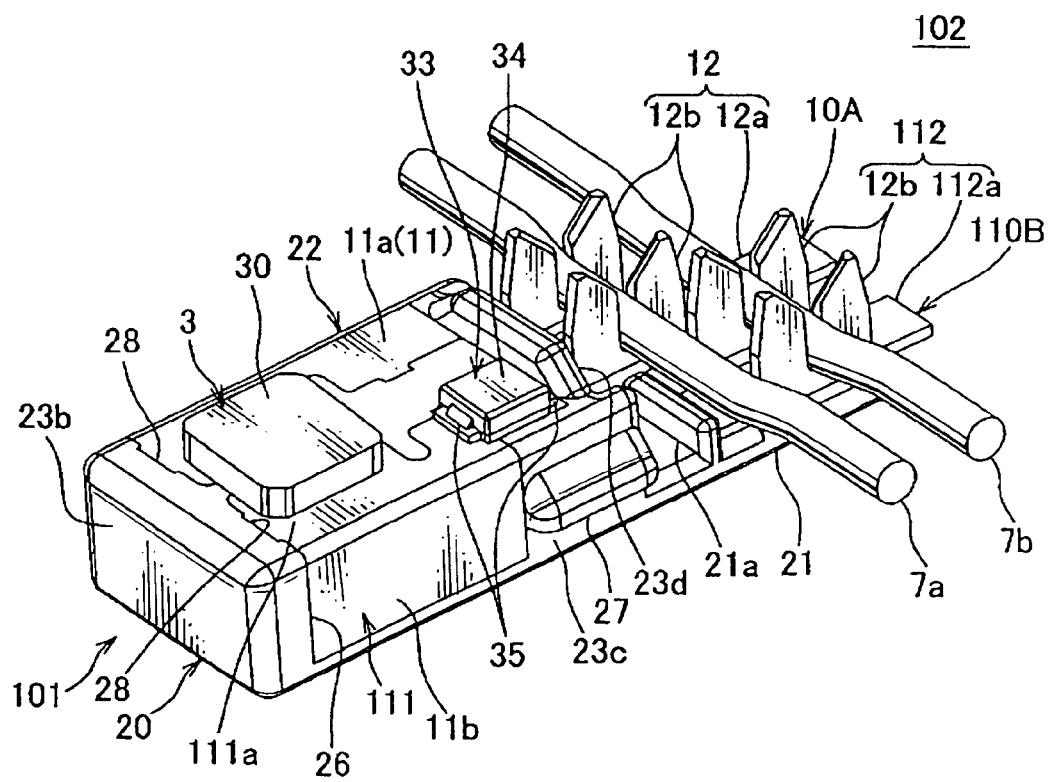
FIG. 15 is a perspective view showing the room-illuminating device shown in FIG. 13 which is assembled.

Next, a connector 101 according to a second embodiment of the present invention will be explained with reference to FIGS. 13 to 15. Incidentally, constituent elements that are substantially the same as in the first embodiment are assigned the same reference numerals and description of the corresponding elements will be omitted.

Figure 13:
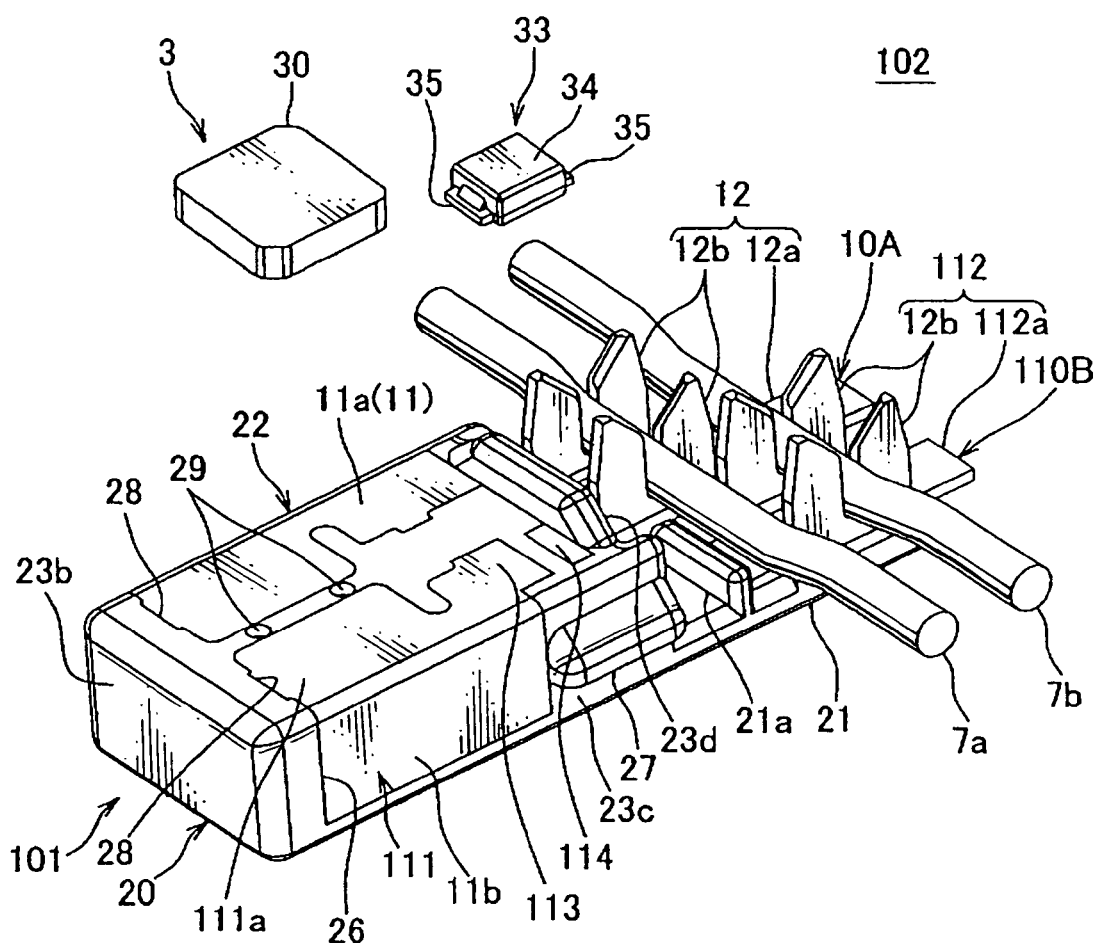
FIG. 13 is an exploded perspective view showing a room-illuminating device having a connector according to a second embodiment of the present invention.

The connector 101 composes a room-illuminating device 102 shown in FIG. 13. The room-illuminating device 102 includes: the connector 101; the LED. 3 as the electronic component; a resistor 33 as a circuit component; and the cover 3 (not shown in FIG. 13).

The connector 101 includes: a pair of terminals 10A, 110B; and the housing 20 in which the terminals 10A, 110B are embedded. The terminal 110B is made by cutting the part-connecting portion 11 of the terminal 10B at the end of the coupling portion 13. As shown in FIG. 14, the terminal 110B separately includes: a part-connecting portion 111; and a battery-connecting portion 112.

The part-connecting portion 111 has the same shape as the part-connecting portion 11 except that the part-connecting portion 111 has an upper plate 111a a little shorter than the upper plate 11a of the terminal 10B. An end of the part-connecting portion 111 at the battery-connecting portion 112 side is a resistor-connecting portion 113 to which the resistor 33 is connected. One electrode 35 of the resistor 33 is overlapped with an upper surface of the resistor-connecting portion 113 exposed from the housing 20 and soldered.

The battery-connecting portion 112 includes: a bottom plate 112a; and the pressure-contact blade 12b. An end of the battery-connecting portion 112 at the part-connecting portion 111 side is a resistor-connecting portion 114 to which the resistor 33 is connected. An upper surface of the resistor-connecting portion 114 exposed from the housing 20 is arranged in the same plane as the surface of the part-connecting portion 111. The other electrode 35 of the resistor 33 is overlapped with the surface of the resistor-connecting portion 114, and soldered.

The resistor 33 has a resistance value which transforms the 12 Volt of the battery into the appropriate voltage for the LED 3 (generally 3.3 Volt). The resistor 33 includes: a flat box-shaped main body 34; and a pair of electrodes 35 respectively projected from side walls parallel to each other. One ends of the pair of electrodes 35 are connected to the main body 34, and the other ends are respectively connected to the resistor-connecting portions 113, 114.

End walls of the pair of electrodes 35 at a bottom wall side of the main body 34 are formed flat, and arranged in the same plane. Further, the end walls of the electrodes 35 are arranged in the same plane as the bottom wall of the main body 34. The resistor 33 is connected to the resistor-connecting portions 113, 114 while the end walls of the electrodes 35 are overlapped with the resistor-connecting portions 113, 114. The resistor 33 connects the part-connecting portion 111 with the battery-connecting portion 112.

The connector 101 is produced similar to the connector 1 using the injection molding machine 5. In the connector 101, a gap between the part-connecting portion 11 of the terminal 10A and the part-connecting portion 111 of the terminal 110B is equal to or more than the specific distance.

When assembling the room-illuminating device 102, the electrodes 35 of the resistor 33 are overlapped with the resistor-connecting portions 113, 114 of the terminal 110B, and soldered to connect the part-connecting portion 111 and the battery-connecting portion 112 via the resistor 33. Further, similar to the first embodiment, the LED 3 is soldered onto the part-connecting portion 11 of the terminal 10A and the part-connecting portion 111 of the terminal 110B. Then, the electric wire 7a comes in pressure-contact with the wire-connecting portion 12 of the terminal 10A, and the electric wire 7b comes in press contact with the battery-connecting portion 112 of the terminal 110B (FIG. 15). Lastly, the cover 4 is attached to the connector 101.

According to this embodiment, because the terminal 110B includes the battery-connecting portion 112 which is connected to the part-connecting portion 111 via the resistor 33, the connector 101 can be directly connected to the electric wires 7a, 7b, without connecting to a circuit having a resistor. Therefore, a circuit to be connected to the connector 101 can be simplified.

In this embodiment, the terminal 110B of the connector 101 is used. However, a terminal 110A (not shown) may be used. The terminal 110A is mirror-symmetric with the terminal 110B, and a detailed explanation of the terminal 110A is omitted. Further, in this embodiment, the circuit component is the resistor 33. However, a constant current diode may be used as the circuit component.

Next, a room-illuminating device 202 according to a third embodiment of the present invention will be explained with reference to FIGS. 16 to 20. Incidentally, constituent elements that are substantially the same as in the first and second embodiments are assigned the same reference numerals and description of the corresponding elements will be omitted.

Figure 16:
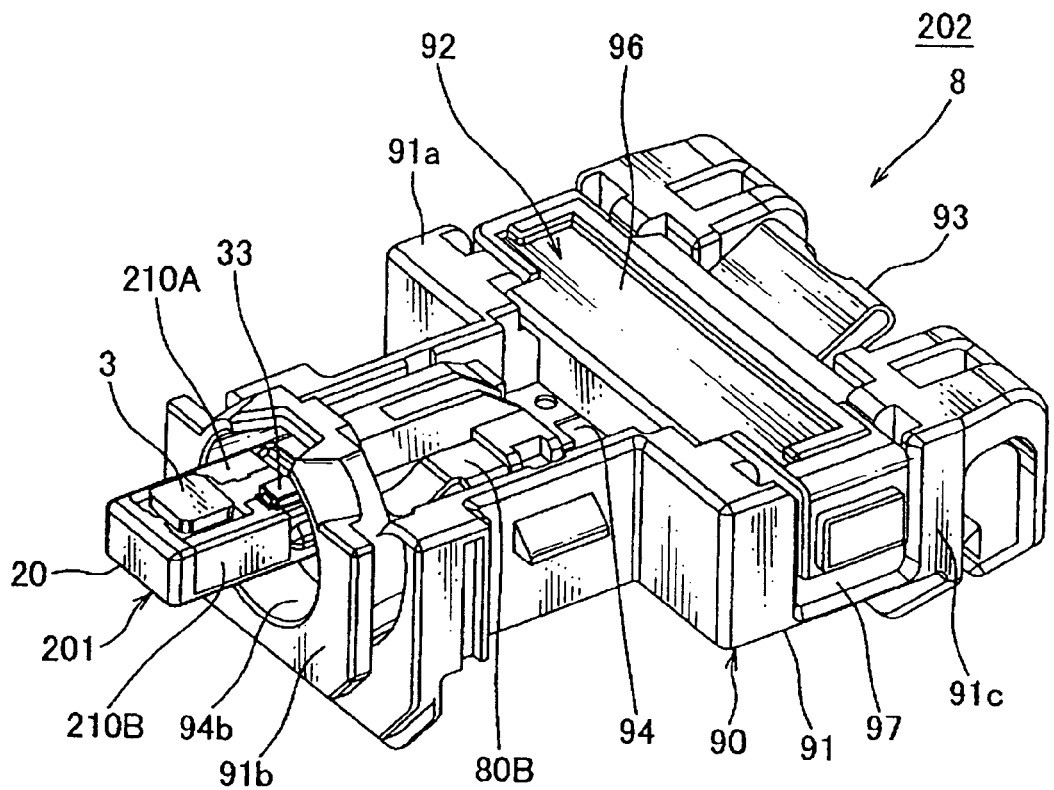
FIG. 16 is a perspective view showing a room-illuminating device according to a third embodiment of the present invention.

As shown in FIG. 16, the room-illuminating device 202 includes: a connector 201; the LED 3 as the electronic component; a resistor 303 as the circuit component; and a bulb connector 8.

Figure 17:
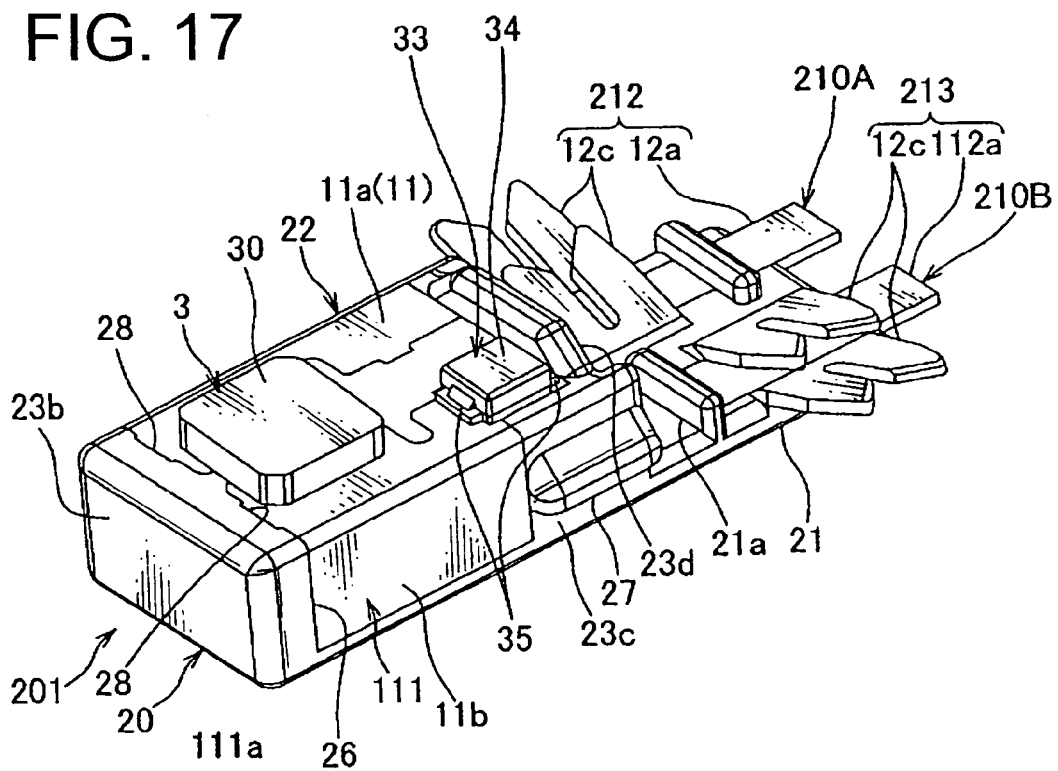
FIG. 17 is a perspective view showing a connector shown in FIG. 16.

As shown in FIG. 17, the connector 201 includes: a pair of terminals 210A, 210B; and a housing 20 in which the terminals 210A, 210B are embedded.

The terminal 210A includes a terminal-connecting portion 212 for connecting with the bulb connector 8 instead of the wire-connecting portion 12 of the terminal 10A. The terminal-connecting portion 212 includes: a bottom plate 12a; and a pressure-contact blade 12c extending from the bottom plate 12a. The pressure-contact blade 12c is folded toward the bottom plate 12a.

The terminal 210B includes a terminal-connecting portion 213 instead of the battery-connecting portion 112 of the terminal 110B. The terminal-connecting portion 213 includes: a bottom plate 112a; and a pressure-contact blade 12c extending from the bottom plate 112a. The pressure-contact blade 12c is folded toward the bottom plate 112a.

Figure 18:
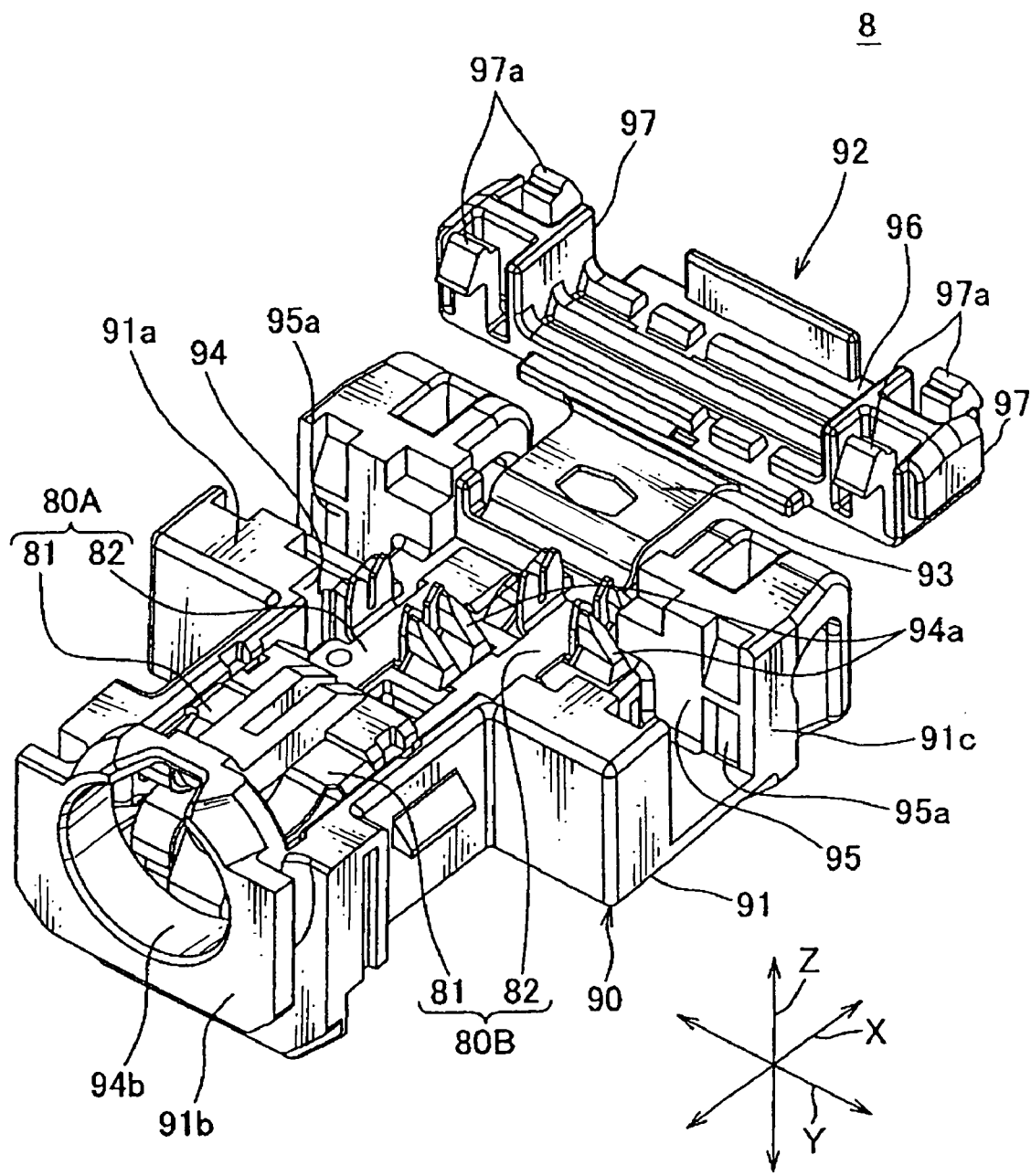
FIG. 18 is a perspective view showing a bulb connector shown in FIG. 16.

As shown in FIG. 18, the bulb connector 8 includes: a pair of terminals 80A, 80B; and a housing 90 to which the terminals 80A, 80B are attached.

Figure 19:
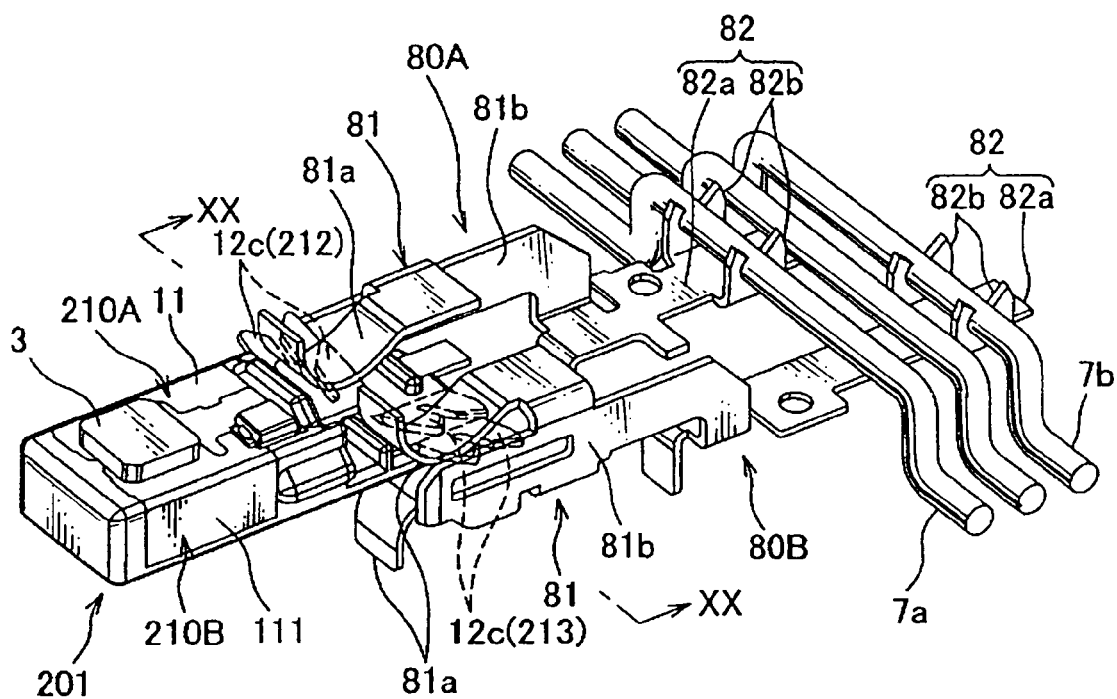
FIG. 19 is a perspective view showing the connector shown in FIG. 17 connected to a terminal.

The terminal 80A is made by pressing a conductive metal plate. As shown in FIG. 19, the terminal 80A integrally includes: an electric contact portion 81; and a wire-connecting portion 82. Incidentally, FIG. 19 is a view in which the housing 90 of FIG. 16 is omitted, and the electric wires 7a, 7b are respectively connected to the terminals 80A, 80B.

The electric contact portion 81 includes: a pair of rectangular plate-shaped clipping pieces 81a facing each other with a gap; and a connecting piece 81b to connect one ends of the pair of clipping pieces in a longitudinal direction thereof. The pair of clipping pieces is elastically curved to close to each other. The electric contact portion 81 can be connected to one electrode (not shown) of the bulb by clipping the one electrode with the pair of clipping pieces 81a. Incidentally, in this embodiment, the electric contact portion 81 is connected to the terminal 210A by clipping the terminal-connecting portion 212 of the terminal 210A.

The wire-connecting portion 82 integrally includes: a bottom plate 82a; and a pressure-contact blade 82b. The bottom plate 82a is formed in a rectangular plate shape, and one end in a longitudinal direction of the bottom plate 82a is continued to the connecting piece 81b. The pressure-contact blade 82b is extended to the other end of the bottom plate 82a in the longitudinal direction. A pair of pressure-contact blades 82b is extended vertically in the same direction from ends in a width direction of the bottom plate 82a. The electric wire 7a is in pressure-contact with the pressure-contact blades 82b.

The terminal 80B is made by pressing a conductive metal plate. The terminal 80B integrally includes: the electric contact portion 81; and the wire-connecting portion 82, and is in mirror-symmetric with the terminal 80A. The terminal 80B is in the same structure as the terminal 80A other than that the pressure-contact blades 82b are further away from the electric contact portion 81 than those of the terminal 80A.

The housing 90 is made of insulating synthetic resin. As shown in FIG. 18, the housing 90 includes: a housing main body 91; a cover 92; and a hinge 93 connecting the housing main body 91 with the cover 92.

The housing main body 91 is formed in a box shape. A terminal-receiving portion 94 for receiving the terminals 80A, 80B, and a wire-receiving portion 95 for receiving the electric wires 7a, 7b connected to the terminals 80A, 80B, are formed on the housing main body 91.

The terminal-receiving portion 94 is concaved from an upper wall 91a of the housing main body 91, and extended in a width direction (arrow Y direction in FIG. 18) of the housing main body 91, and in a longitudinal direction (arrow X direction) of the housing main body 91. Both ends of the terminal-receiving portion 94 are open to a front wall 91b and a rear wall. A plurality of supporting pieces 94a for supporting the pressure-contact blades 82b is projected from a bottom wall of the terminal-receiving portion 94.

The terminal-receiving portion 94 receives the terminals 80A, 80B in an isolating condition. The terminal-receiving portion 94 receives the electric contact portion 81 at the front wall 91b side, and receives the wire-connecting portion 82 at the rear wall side. Further, an electrode of the bulb can be inserted into the terminal-receiving portion 94 via an opening 94b at the front wall 91b. Incidentally, in this embodiment, the connector 201 is inserted via the opening 94b.

The wire-receiving portion 95 is concaved from an upper wall 91a of the housing main body 91, and extended in the width direction (arrow Y direction) of the housing main body 91 perpendicular to the terminal-receiving portion 94. The wire-receiving portion 95 receives the neighbor of the electric wires 7a, 7b connected to the wire-connecting portion 82. Both ends of the wire-receiving portion 95 are deeper than the center of the wire-receiving portion 95. A plurality of locking concaves 95a for engaging with the cover 92 is formed on inner walls at the both ends of the wire-receiving portion 95.

The cover 92 includes: a rectangular plate-shaped wall 96 substantially corresponding to a planar shape of the wire-receiving portion 95; and wire-holding portions 97 extending vertically from both ends of the wall 96. A plurality of locking arms 97a for engaging with the locking concaves 95a of the wire-receiving portion 95 is formed on the wire-holding portions 97. The hinge 93 is formed in a thin plate shape, one end of the hinge 93 is continued to the rear wall of the housing main body 91, and the other end is continued to the wall 96 of the cover 92.

When the hinge 93 is turned, the cover 92 is received in the wire-receiving portion 95, and the locking arms 97a are engaged with the locking concaves 95a. At this time, the wall 96 covers an opening at the upper wall 91a side of the wire-receiving portion 95, and the wire-holding portions 97 are received in the both ends of the wire-receiving portion 95. The wire-holding portions 97 clip the electric wires 7a, 7b with bottom walls of the both ends of the wire-receiving portion 95 to hold the electric wires 7a, 7b in the wire-receiving portion 95 in folding state, and prevent the electric wires 7a, 7b from falling out in the longitudinal direction of the electric wires 7a, 7b.

When assembling the room-illuminating device 202, the terminal-connecting portions 212, 213 of the connector 201 face the opening 94b of the bulb connector 8, and the connector 201 is inserted into the opening 94b. Then, the terminal-connecting portion 212 of the terminal 210A and the bottom wall 21 of the housing 20 are inserted between the pair of clipping pieces 81a of the terminal 80A, and clipped between the clipping pieces 81a. Similarly, the terminal-connecting portion 213 of the terminal 210B and the bottom wall 21 of the housing 20 are inserted into the pair of clipping pieces 81a of the terminal 80B, and clipped between the clipping pieces 81*a*. Thus, as shown in FIG. 16, the connector 201 is attached to the bulb connector 8.

Figure 20:
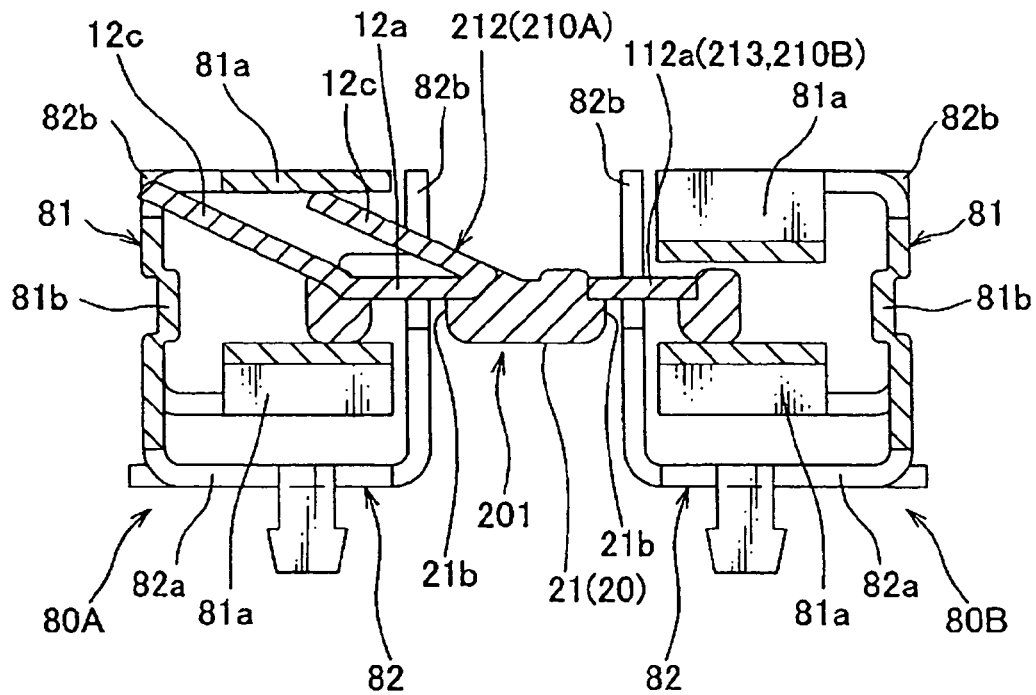
FIG. 20 is a sectional view showing taken on line XX-XX of FIG. 19.

At this time, as shown in FIG. 20 (electric wires 7*a*, 7*b* are omitted), a surface of the pressure-contact blade 12*c* of the terminal 210A is in close-contact with a surface of one of the pair of clipping pieces 81*a*, and the terminal-connecting portion 212 of the terminal 210A is connected to the electric contact portion 81 of the terminal 80A. Similarly, the terminal-connecting portion 213 of the terminal 210B is connected to the electric contact portion 81 of the terminal 80B. Namely, the connector 201 is connected to the bulb connector 8.

Then, the cover 92 is open, and the electric wire 7*a* is in pressure-contact with the wire-connecting portion 82 of the terminal 80A, and the electric wire 7*b* is in pressure-contact with the wire-connecting portion 82 of the terminal 80B, thereby the electric wires 7*a*, 7*b* are respectively connected to the terminals 80A, 80B. Lastly, the cover 92 is engaged with the wire-receiving portion 95.

According to this embodiment, because the terminals 210A, 210B include the terminal-connecting portions 212, 213, the connector 201 can be connected to the bulb connector 8, and the LED 3 can be connected to the bulb connector 8. Accordingly, a light source of the room-illuminating device 202 can be selected from the light bulb and the LED 3. Thus, general versatility of the room-illuminating device 202 is improved.

Further, when the pressure-contact blade 12*c* is not folded, the electric wires 7*a*, 7*b* can be connected to the terminal-connecting portions 212, 213 (second embodiment). Therefore, the connector 201 which is connectable to the electric wires 7*a*, 7*b* can be connected to the bulb connector 8. Further, because the surface of the pressure-contact blade 12*c* contacts the surface of the clipping piece 81*a*, the pressure-contact blade 12*b* are in line-contact with the electric contact portion 81. Thus, contacting reliability of the connector 201 with the bulb connector 8 is improved.

In this embodiment, the room-illuminating device 202 includes the connector 201. However, the room-illuminating device 202 may includes the connector 1 of which pressure-contact blade 12*b* is folded.

Next, an LED unit 301 according to a fourth embodiment of the present invention will be explained with reference to FIGS. 21 to 28. The LED unit 301 includes: a radiating portion for effectively radiating heat generated by an LED chip 309; and a shock absorbing portion for preventing a shock generated when an electric wire is in pressure-contact with the LED unit from being transmitted to an LED packaging portion.

Figure 21:
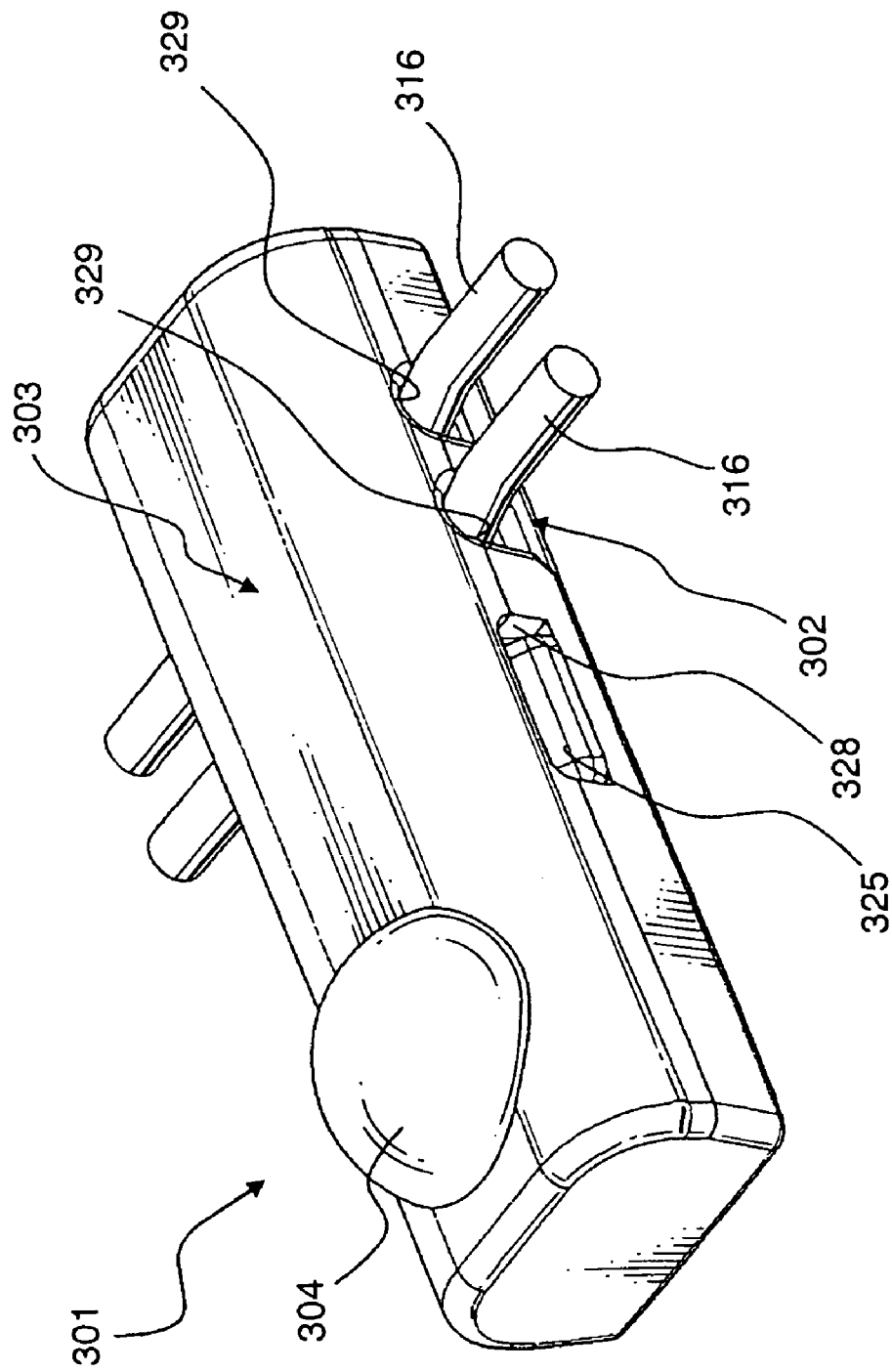
FIG. 21 is a perspective view showing an LED unit according to the present invention.

The LED unit 301 is used in a vehicle. As shown in FIG. 21, the LED unit 301 includes: a unit sub-assy 302; and a cover 303 mounted on the unit sub-assy 302. An LED lens 304 is mounted on the cover 303.

Figure 22:
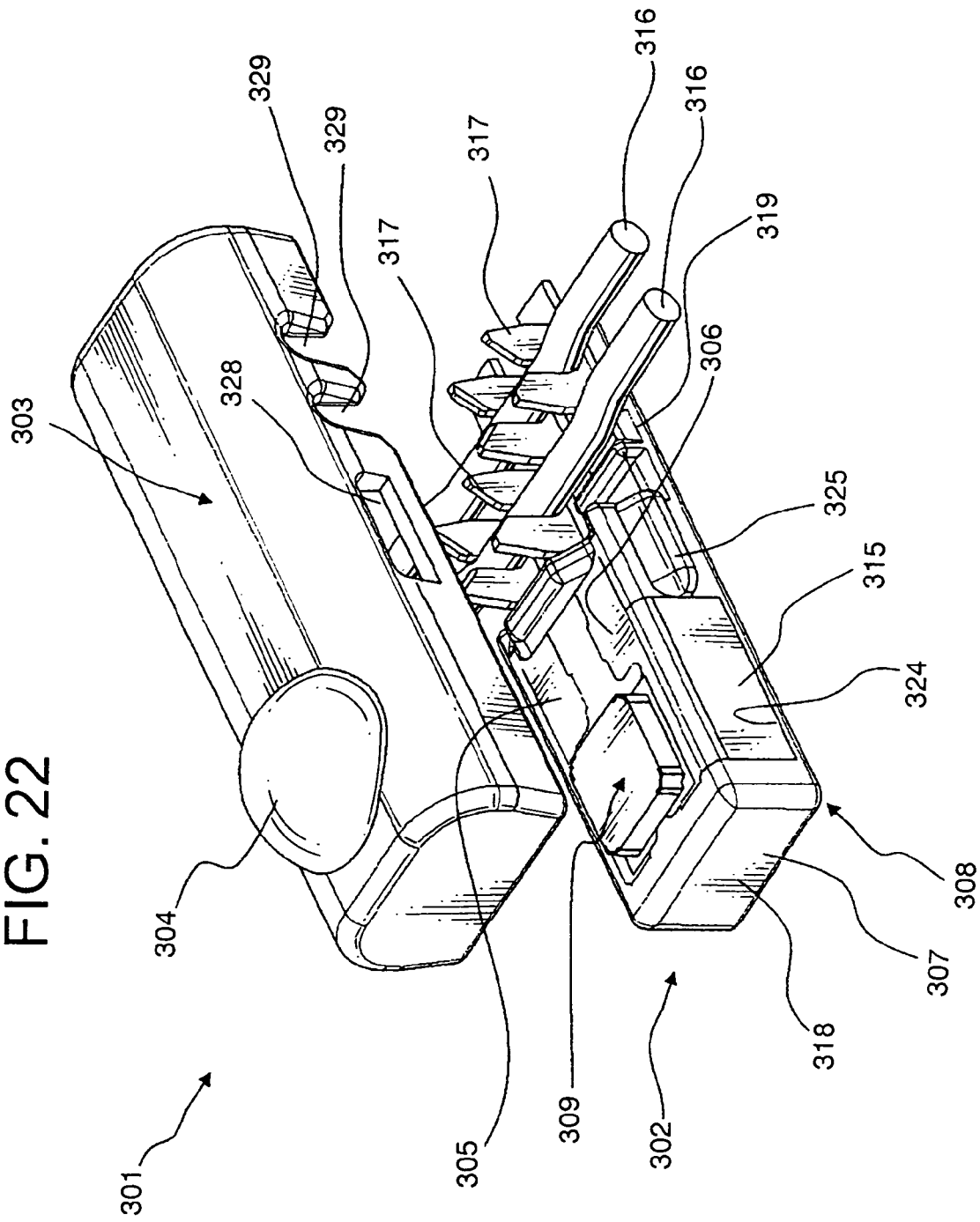
FIG. 22 is an exploded perspective view showing the LED unit shown in FIG. 21.

As shown in FIG. 22, the unit sub-assy 302 includes: an insert-molding product 308 composed of a pair of bus bars 305, 306 insert-molded in a housing 307; the LED chip 309 packaged between the pair of bus bars 305, 306.

Figure 23:
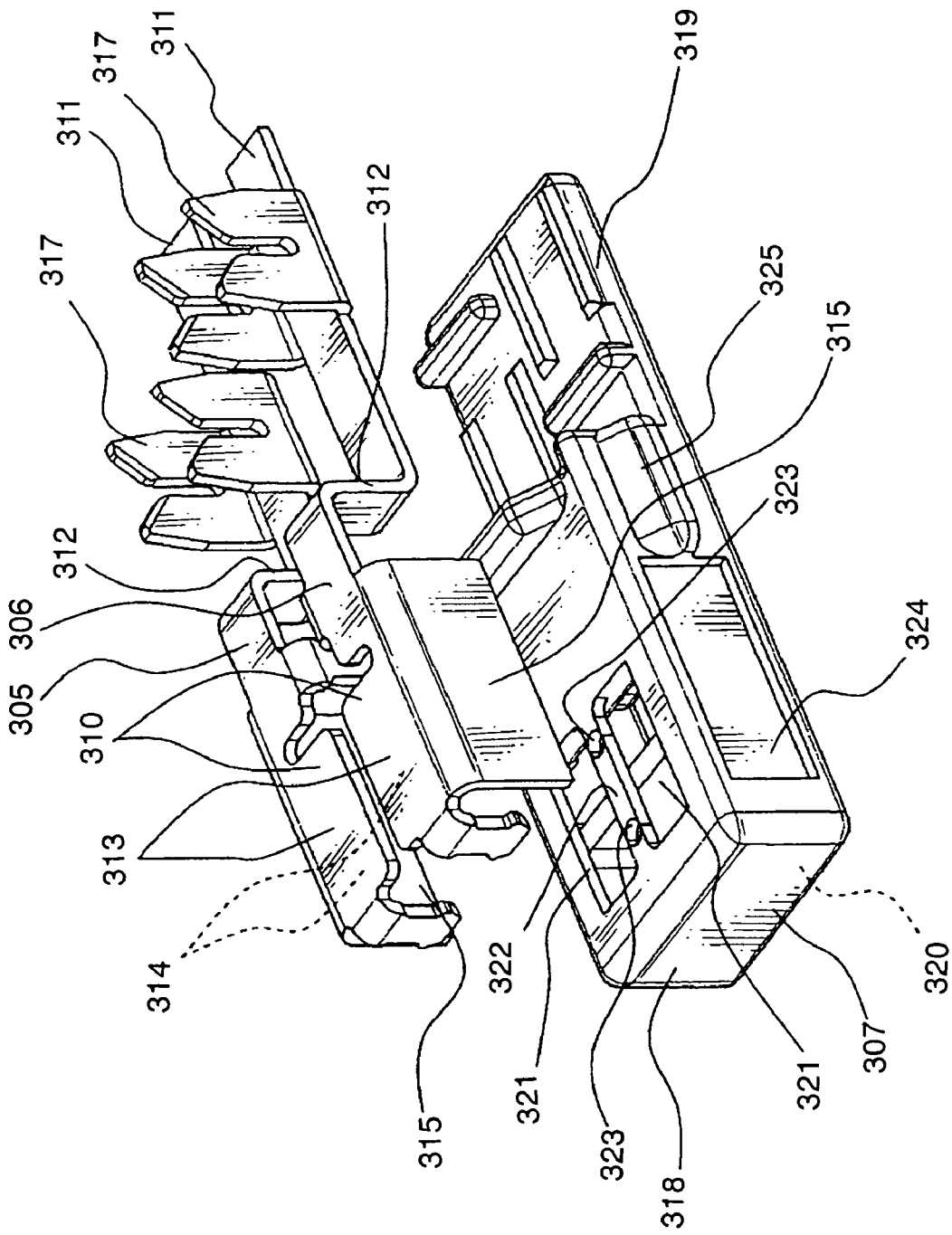
FIG. 23 is a perspective view showing a bus bar and a housing in which the bus bar is not insert-molded.

As shown in FIG. 23, the pair of bus bars 305, 306 are made by punching and folding a conductive metal plate. Each of the bus bars 305, 306 includes: an LED packaging portion 310; a wire-connecting portion 311; and a shock-absorbing portion 312.

Figure 28:
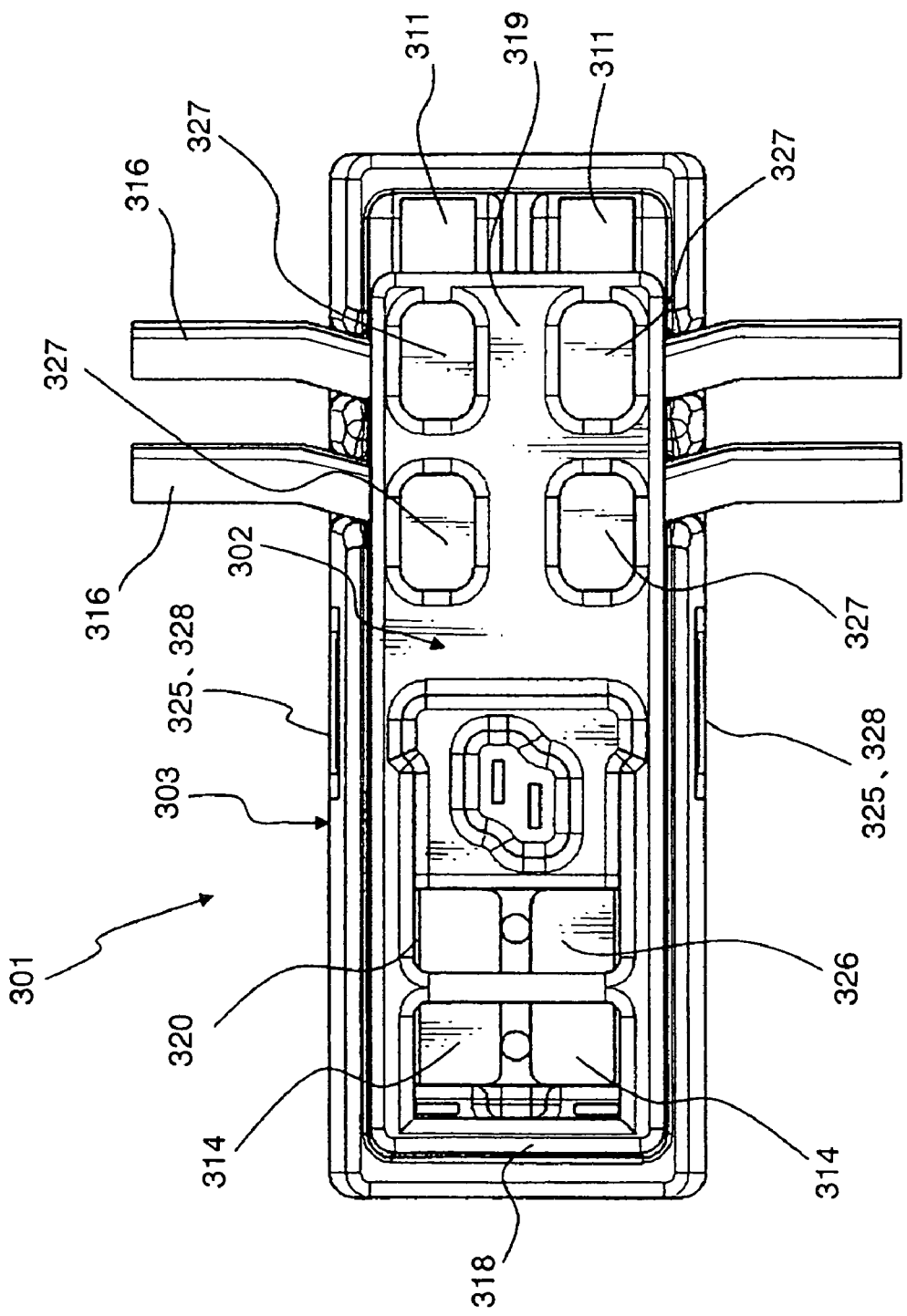
FIG. 28 is a bottom view showing the LED unit.

The LED packaging portion 310 includes: a packaging wall 313 on which the LED chip 309 is packaged; and a non-packaging wall 314 disposed at an opposite side of the packaging wall 313 (FIG. 28). The packaging wall 313 and the non-packaging wall 314 are formed flat. The packaging wall 313 is an upper wall of the LED packaging portion 310, and the non-packaging wall 314 is a lower wall of the LED packaging portion 310.

The LED packaging portions 310 of the bus bars 305, 306 are arranged with a specific gap. Flat rectangular radiating pieces 315 are respectively extended from right and left side walls of the LED packaging portions 310. The radiating pieces 315 are folded toward the non-packaging wall 314.

Electric wires 316 (FIG. 22) are connected to the wire-connecting portions 311. The wire-connecting portion 311 includes: a pressure-contact blade 317. The pressure-contact blades 317 are shifted in a longitudinal direction of the bus bars 305, 306.

The shock-absorbing portion 312 is formed between the wire-connecting portion 311 and the LED packaging portion 310. The shock-absorbing portion 312 absorbs the shock generated when the electric wire 316 comes in pressure-contact with the pressure-contact blade 317 so that the shock is not directly transmitted to the LED packaging portion 310. The LED packaging portion 310 is extended from an upper side of the shock-absorbing portion 312, and the wire-connecting portion 311 is extended from a lower side of the shock-absorbing portion 312. A height of the shock-absorbing portion 312 corresponds to a size of a later-described radiating space 326. The shock-absorbing portion 312 is a folded part of each of bus bars 305, 306.

The housing 307 is made by injection molding insulating synthetic resin. Further, the pair of bus bars 305, 306 is insert-molded in the housing 307.

As shown in FIG. 23, the housing 307 includes: a bottomless box portion 318; and a plate portion 319 extending from a rear side of the bottomless box portion 318. The bottomless box portion 318 includes: an upper wall; a left wall; a right wall; a front wall; a rear wall; an inner space corresponding to the later-described radiating space 326; and a radiating opening 320 communicating with the inner space.

The LED packaging portions 310 and the shock-absorbing portions 312 of the bus bars 305; 306 are insert-molded in the bottomless box portion 318.

A pair of windows 321 is formed on the upper wall of the bottomless box portion 318. The packaging walls 313 of the LED packaging portion 310 in the pair of bus bars 305, 306 are exposed via the pair of windows 321 after insert molding. Further, the non-packaging wall 314 is exposed to the inner space via the window 321. A bridge 322 is formed between the pair of windows 321. Positioning holes 323 (FIG. 24) for the LED chip 309 (FIG. 22) is formed on the bridge 322.

A concave portion 324 and a locking portion 325 are formed on each of the left and right walls of the bottomless box portion 318. The radiating piece 315 of each of bus bars 305, 306 is exposed via the concave portion 324 after insert molding. The locking portion 325 is engaged with the cover 303 (FIG. 22).

The wire-connecting portions 311 of the pair of bus bars 305, 306 are insert molded in the plate portion 319.

Figure 27:
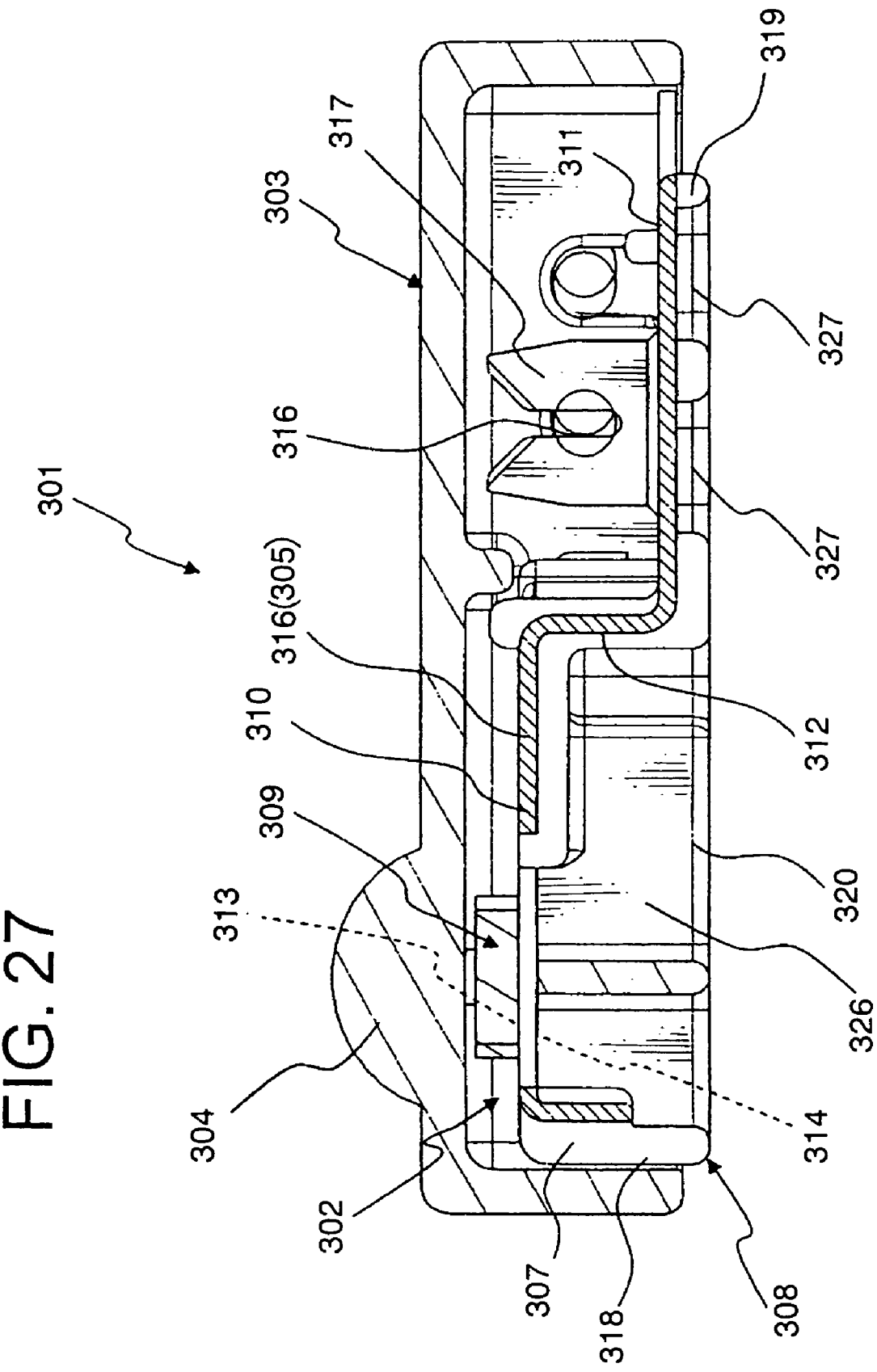
FIG. 27 is a sectional view showing the LED unit.

As shown in FIG. 27, the radiating space 326 as the inner space is formed between the non-packaging walls 314 of the LED packaging portions 310 of the pair of bus bars 305, 306 and the radiating opening 320. Further, a lower radiating space (the second radiating space) 327 is formed on the plate portion 319 via which the lower walls of the wire-connecting portions 311 are exposed. The radiating space 326 and the second radiating space 327 directly radiate the heat of the pair of bus bars 305, 306.

Figure 24:
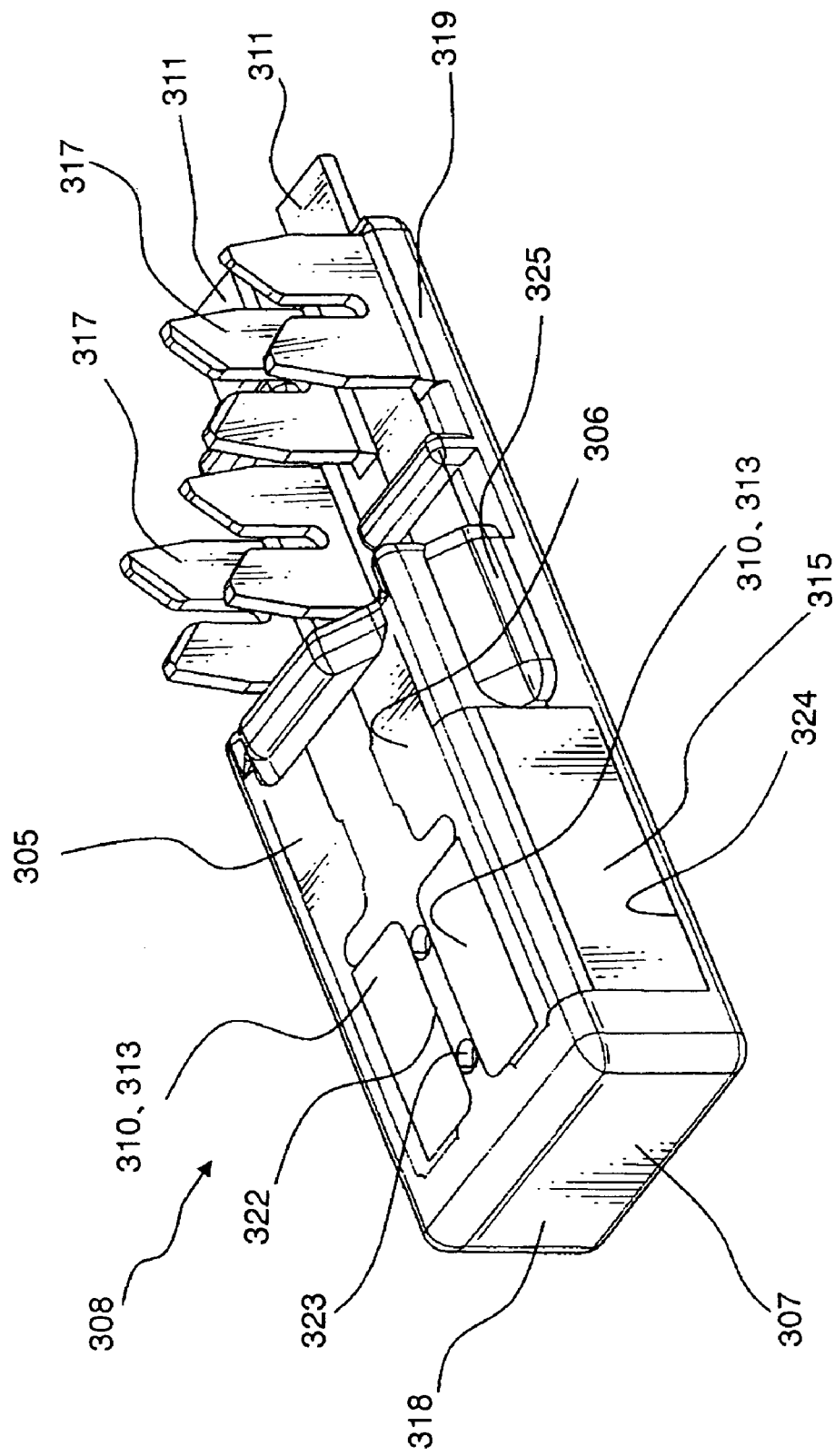
FIG. 24 is a perspective view showing an insert-molded product in which the bus bar is insert-molded to the housing.
Figure 25:
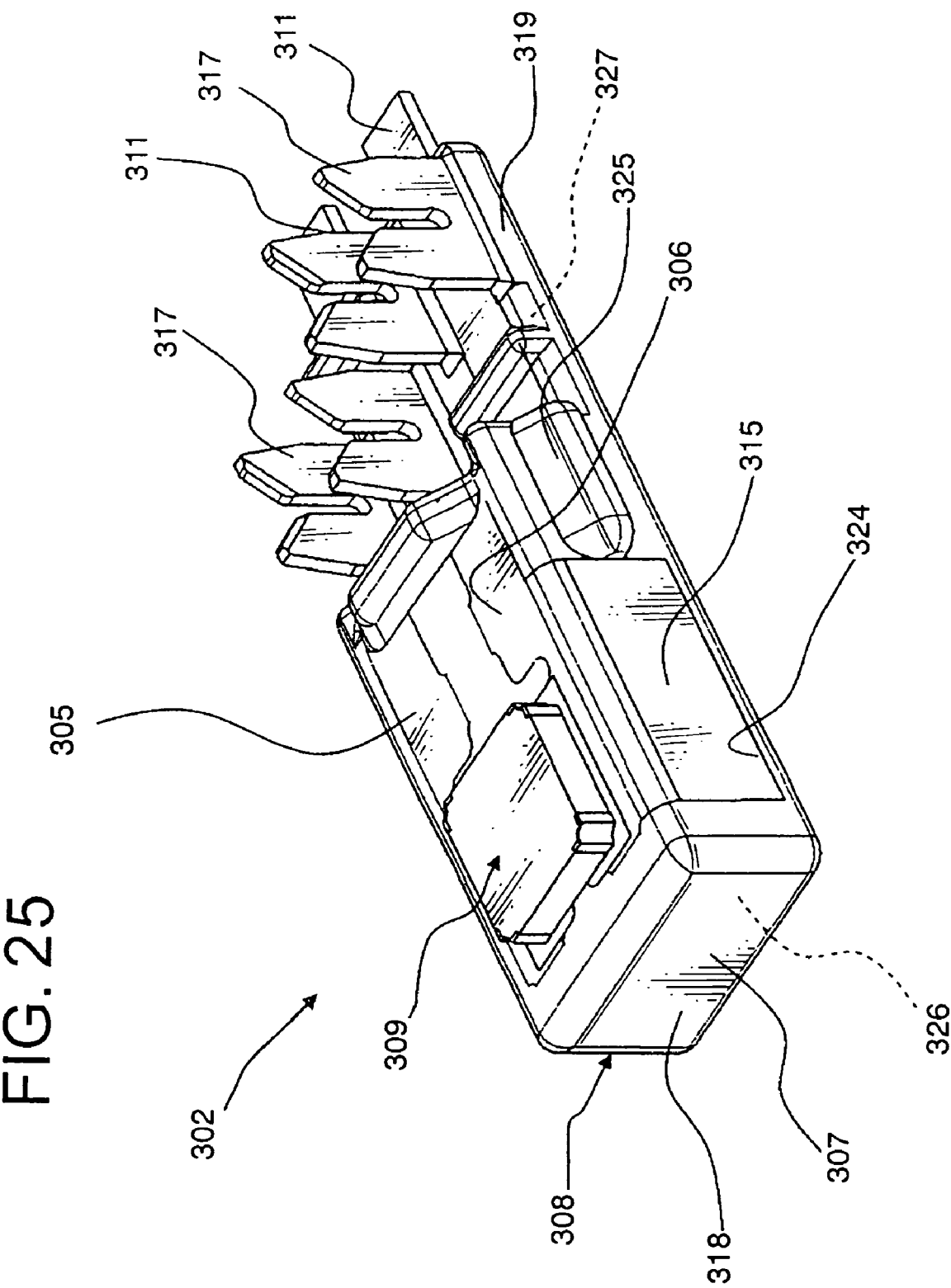
FIG. 25 is a perspective view of a unit sub-assy composed of a insert-molded bus bar and an LED chip.

As shown in FIG. 24, the insert-molding product 308 is formed by insert-molding the bus bars 305, 306 in the housing 304. Then, as shown in FIG. 25, the unit sub-assy 302 is formed by packaging the LED chip 309 with solder on the LED packaging portions 310 of the pair of bus bars 305, 306 of the insert-molding product 308.

Figure 26:
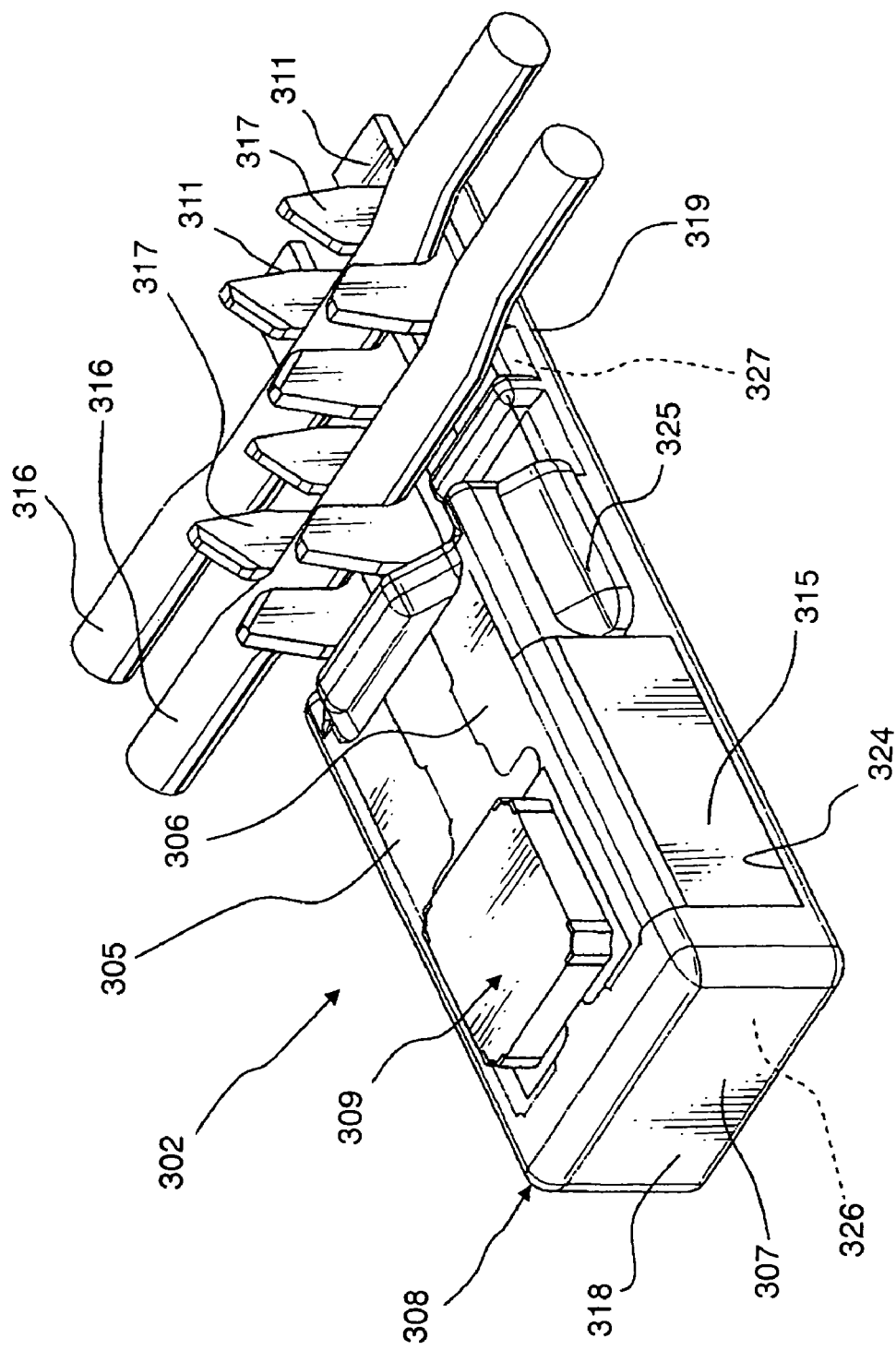
FIG. 26 is a perspective view showing the unit sub-assy connected to an electric wire.

FIG. 26 shows the unit sub-assy 302 in which the electric wires 316 are in pressure-contact. When the electric wires 316 are in pressure-contact, the unit sub-assy 302 is connected to a battery.

As shown in FIGS. 21, 22, and 27, a shape of the cover 303 corresponds to a shape of the unit sub-assy 302. The LED lens 304 provided on the cover 303 is aligned with a packaging position of the LED chip 309. Locking portions 328 are formed on both left and right sides of the cover 303. The locking portions 328 are engaged with the locking portions 325 of the unit sub-assy 302. A plurality of slits 329 are formed at a rear side of the locking portions 328 for extracting the electric wires 316.

When assembling the LED unit 301 as shown in FIG. 21, the cover 303 covers the unit sub-assy 302 in which the electric wires 316 are in pressure-contact as shown in FIG. 2, then, the cover 303 is engaged with the unit sub-assy 302.

As shown in FIGS. 27 and 28, because the LED unit 301 includes: radiating spaces 326, 327, the heat generated by the LED chip 309 is radiated to the heat radiating space 326 via the non-packaging walls 314 of the pair of bus bars 305, 306, radiated to the second radiating space 327 via the wire-connecting portions 311 of the pair of bus bars 305, 306, and radiated to an outside of the LED unit 301 via the radiating spaces 326, 327. Therefore, the heat generated by the LED chip is effectively radiated. In addition, the radiating pieces 315 exposed at both left and right sides of the unit sub-assy 302 also radiates the heat generated by the LED chip 309. Therefore, heat effect on the LED unit 301 can be eliminated.

Further, according to this embodiment, because the shock-absorbing portions 312 are formed on the bus bars 305, 306, the shock when the electric wire 316 comes in pressure-contact is hard to be transmitted to the LED packaging portion 310 (in particular, a soldered portion of the LED chip 309). Therefore, packaging reliability of the LED chip 309 is increased.

Further, according to this embodiment, because the shock-absorbing portions 312 are extended vertically, a height position where the electric wires 316 come in pressure-contact is different from a height position of packaging the LED chip 309. Therefore, when the electric wires 316 come in pressure-contact, the electric wires 316 are prevented from damaging the LED lends 304. Therefore, light-emitting performance of the LED chip 309 is increased.

In addition, according to this embodiment, the LED unit 301 can be shorter in height than a conventional LED unit (for example, see Japanese Published Patent Application No. 2005-93900).

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An LED unit comprising:
   an LED chip;
   a conductive metallic bus bar;
   a housing made of insulating synthetic resin;
   an LED packaging portion formed on the bus bar, having a packaging surface on which the LED chip is packaged, and a non-packaging surface opposite to the packaging surface;
   a heat-radiating opening formed on the housing with which the bus bar is integrally formed; and
   a heat-radiating space interposed between the non-packaging surface and the heat-radiating opening.

2. The LED unit as claimed in claim 1,
   wherein a heat-radiating piece folded toward the non-packaging surface is coupled to the LED packaging portion, and exposed to a side of the housing.

3. The LED unit as claimed in claim 1,
   wherein a wire-connecting portion for connecting an electric wire is formed on the bus bar, and a shock-absorbing portion for absorbing a shock generated by connecting the electric wire is formed between the wire-connecting portion and the LED packaging portion.

4. The LED unit as claimed in claim 3,
   wherein the shock-absorbing portion is a folding portion of the bus bar of which upper side is continued to the LED packaging portion, and of which lower side is continued to the wire-connecting portion.

5. The LED unit as claimed in claim 3,
   wherein a second heat-radiating space is formed under the wire-connecting portion.

* * * * *